(12) United States Patent
Miniskar et al.

(10) Patent No.: US 12,411,721 B2
(45) Date of Patent: Sep. 9, 2025

(54) EFFICIENT MEMORY MANAGEMENT FOR HETEROGENEOUS COMPUTING

(71) Applicant: UT-Battelle, LLC, Oak Ridge, TN (US)

(72) Inventors: Narasinga Rao Miniskar, Knoxville, TN (US); Mohammad Alaul Haque Monil, Knoxville, TN (US); Pedro Valero Lara, Knoxville, TN (US); Jeffrey S. Vetter, Oak Ridge, TN (US); Frank Y. Liu, Norfolk, VA (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 18/414,870

(22) Filed: Jan. 17, 2024

(65) Prior Publication Data

US 2025/0103235 A1 Mar. 27, 2025

Related U.S. Application Data

(60) Provisional application No. 63/539,785, filed on Sep. 21, 2023.

(51) Int. Cl.
*G06F 9/54* (2006.01)
*G06F 9/46* (2006.01)

(52) U.S. Cl.
CPC ............. *G06F 9/543* (2013.01); *G06F 9/544* (2013.01); *G06F 9/465* (2013.01)

(58) Field of Classification Search
None
See application file for complete search history.

(56) References Cited

U.S. PATENT DOCUMENTS

| | | | |
|---|---|---|---|
| 6,438,659 B1* | 8/2002 | Bauman | G06F 12/0817 711/E12.027 |
| 2012/0216216 A1* | 8/2012 | Lopez Taboada | G06F 9/544 719/314 |
| 2019/0286717 A1* | 9/2019 | Mattankot | G06F 16/13 |
| 2019/0312772 A1* | 10/2019 | Zhao | H04L 41/12 |
| 2020/0364088 A1* | 11/2020 | Ashwathnarayan | G06F 9/5016 |

(Continued)

OTHER PUBLICATIONS

Zhang et al. "Fractal Coherence: Scalably Verifiable Cache Coherence." 2010. IEEE/ACM. 2010 43rd Annual IEEE/ACM International Symposium on Microarchitecture. pp. 471-482.*

(Continued)

*Primary Examiner* — Nathan Sadler
(74) *Attorney, Agent, or Firm* — Klarquist Sparkman, LLP

(57) ABSTRACT

In a heterogeneous computing environment, a validity flag indicates whether a given memory has a valid copy of a given data object. When the data object is required at a target memory for a scheduled task, another (source) memory having a valid copy of the data object is identified. A protocol guides selection of the source memory based on efficiency of data transfer to the target memory. A data transfer command is generated at runtime, when tasks have been scheduled among respective processors. Execution of the command copies the valid data object from the source memory to the target memory. Superior performance is achieved even in extremely heterogeneous environments. Performance results, variations, and applications are presented.

12 Claims, 11 Drawing Sheets

(56) References Cited

U.S. PATENT DOCUMENTS

2021/0373982 A1* 12/2021 Neilson ............... G06F 12/0833

OTHER PUBLICATIONS

Ziabari et al. "UMH: A Hardware-Based Unified Memory Hierarchy for Systems with Multiple Discrete GPUs." Dec. 2016. ACM. ACM Transactions on Architecture and Code Optimization. vol. 13. Article 35.*

Brendan Burns. Designing Distributed Systems. Dec. 2018. O'Reilly. Chapter 7.*

OpenUCX. "Frequently Asked Questions." 2019. https://openucx.readthedocs.io/en/master/faq.html.*

Kim et al. "IRIS: A Portable Runtime System Exploiting Multiple Heterogeneous Programming Systems." Sep. 2021. IEEE. HPEC 2021.*

OpenMP. OpenMP Application Programming Interface. Nov. 2021. OpenMP. Version 5.2.*

Thomadakis et al. "Runtime Support for Performance Portability on Heterogeneous Distributed Platforms." Mar. 2023. arXiv. https://arxiv.org/pdf/2303.02543.*

Polykarpos Thomadakis. Towards Intelligent Runtime Framework for Distributed Heterogeneous Systems. Aug. 2023. Old Dominion University. Thesis. https://digitalcommons.odu.edu/cgi/viewcontent.cgi?article=1140&context=computerscience_etds.*

Miniskar et al. "IRIS-DMEM: Efficient Memory Management for Heterogeneous Computing." Sep. 2023. IEEE. 2023 IEEE High Performance Extreme Computing Conference.*

Cabrera et al., "Toward Performance Portable Programming for Heterogeneous Systems on a Chip: A Case Study with Qualcomm Snapdragon SoC," *IEEE High Performance Extreme Computing Conference (HPEC)*, 7 pages (Sep. 2021).

Dongarra et al., PLASMA: Parallel Linear Algebra Software for Multicore Using OpenMP, *ACM Transactions on Mathematical Software*, vol. 45, No. 2, Article 16, pp. 1-35 (Apr. 2019).

Kim et al., "IRIS: A Portable Runtime System Exploiting Multiple Heterogenous Programming System," *IEEE High Performance Extreme Computing Conference (HPEC)*, pp. 1-8 (Sep. 2021).

McCalpin, "HPL and DGEMM Performance Variability on the Xeon Platinum 8160 Processor," in Proc. International Conference for High Performance Computing, Networking, Storage, and Analysis, SC 2018, Dallas, TX, USA 13 pages (Nov. 2018).

Tomov et al., "Towards Dense Linear Algebra for Hybrid GPU Accelerated Manycore Systems," *Parallel Computing*, vol. 36, No. 5-6, pp. 232-240 (Jun. 2010).

Valero-Lara et al., "Fast Finite Difference Poisson Solvers on Heterogeneous Architectures," *Computer Physics Communications*, vol. 185, No. 4, pp. 1265-1272, (Jan. 2014).

Valero-Lara et al., "Accelerating Fluid-Solid Simulations (Lattice-Boltzmann & Immersed-Boundary) on Heterogeneous Architectures," *Journal of Computational Science*, vol. 10, pp. 249-261 (Jul. 2015).

Valero-Lara et al., "Heterogeneous CPU+GPU Approaches for Mesh Refinement Over Lattice-Boltzmann Simulations," *Concurrency Computation Practice Experience*, vol. 29, No. 7, pp. 1-20 (Aug. 2016).

Valero-Lara et al., "sLASs: A Fully Automatic Auto-Tuned Linear Alegra Library Based on OpenMP Extensions Implemented in OmpSs (LASs Library)," *Journal of Parallel and Distributed Computing*, vol. 138, pp. 153-171 (Jan. 2020).

* cited by examiner

EFFICIENT MEMORY MANAGEMENT FOR HETEROGENEOUS COMPUTING

CROSS REFERENCE TO RELATED APPLICATIONS

This application claims the benefit of U.S. Provisional Patent Application No. 63/539,785, filed on Sep. 21, 2023, which application is incorporated herein by reference in entirety.

ACKNOWLEDGMENT OF GOVERNMENT SUPPORT

This invention was made with government support under Contract No. DE-AC05-00OR22725 awarded by the U.S. Department of Energy (DOE). The government has certain rights in the invention. This research was also funded by the DOE Office of Advanced Scientific Computing Research through the Sawtooth Advanced Memory Systems Project.

BACKGROUND

Heterogeneous computing couples processors of differing architectures to enhance computing power. For a particular computer program, elapsed time or energy consumed can be lower than for a competing homogeneous computing system. In a heterogeneous environment, tasks can be distributed by a task scheduler among the processors. Often, a heterogeneous system can have multiple memories, coupled to the processors with varying memory bandwidths or latencies. First and second processors can have low latency and high bandwidth coupling to respective "local" memories, and may have high latency or low bandwidth coupling to each other's local memory. Thus, the first processor may execute a first task to generate an output data object in its local memory, and that data object may be required input by a second task scheduled to run on a second processor. For efficient execution of both tasks, it can be desirable to transfer the data object from the first processor's local memory to the second processor's local memory. But, the efficiency of data transfers can vary. In particular, processors of a given class may support a high-performance data transfer capability not available to other processors of a different class. Because the processors to which related tasks are allocated may not be known till runtime, it can be difficult to utilize such high-performance data transfer facilities in a heterogeneous computing environment. Conventionally, pre-programmed memory transfers can utilize a hub-and-spoke data transfer architecture, wherein output from the first task is transferred from the first processor's local memory to host memory, and then from the host memory to the second processor's local memory for input to the second task. Thus, an available direct high-performance data transfer facility can be ignored, to the detriment of system performance. Alternatively, manually coded data transfers can be used, which can reduce overhead somewhat, but cannot overcome the challenge of task allocations not being known until runtime. Again, high-performance data transfer facilities may be left unutilized. Further approaches may constrain the processors to which related tasks can be assigned, but these limit a task scheduler's ability to optimize system performance.

Accordingly, there remains a need for improved technology for memory management in a heterogeneous computing environment.

SUMMARY

In brief, the disclosed technologies maintain metadata in the form of validity flags which indicate whether a given memory has a valid copy of a given data object. When a data object is required at a target memory for a scheduled task, another (source) memory having a valid copy of the data object can be identified. A suitable data transfer command can be generated and executed to copy the valid data object from the source memory to the target memory. In examples, the data transfer command can be generated at runtime, when tasks have been scheduled among respective processors, and the locations of valid copies of the data object are known. In examples, where multiple source memories are available, a protocol can be used to select the source memory based on efficiency of data transfer to the target memory.

In one aspect, the disclosed technologies can be embodied by computer-readable media storing instructions which, when executed by one or more hardware processors, cause the one or more hardware processors to perform the following operations. A first determination is made that a received request requires a valid copy of a first data object in a first memory. Metadata associated with the first data object includes a plurality of validity flags corresponding to respective memories including the first memory and a second memory, each validity flag indicating whether the respective memory has a copy of the first data object that is valid. A second determination is made, based on the validity flag of the first memory, that the first memory does not have the valid copy of the first data object. A second memory is identified, based on one or more additional flags among the validity flags, as having a second copy of the first data object that is valid. A command is determined, at runtime, to perform a data transfer of the second copy of the first data object from the second memory to the first memory; and executing the command.

In other aspects, the disclosed technologies can be embodied as a corresponding method implementing such operations; or as a computing system configured to perform such operations.

The foregoing and other objects, features, and advantages of the invention will become more apparent from the following detailed description, which proceeds with reference to the accompanying figures.

DETAILED DESCRIPTION

Introduction

Figure 1:
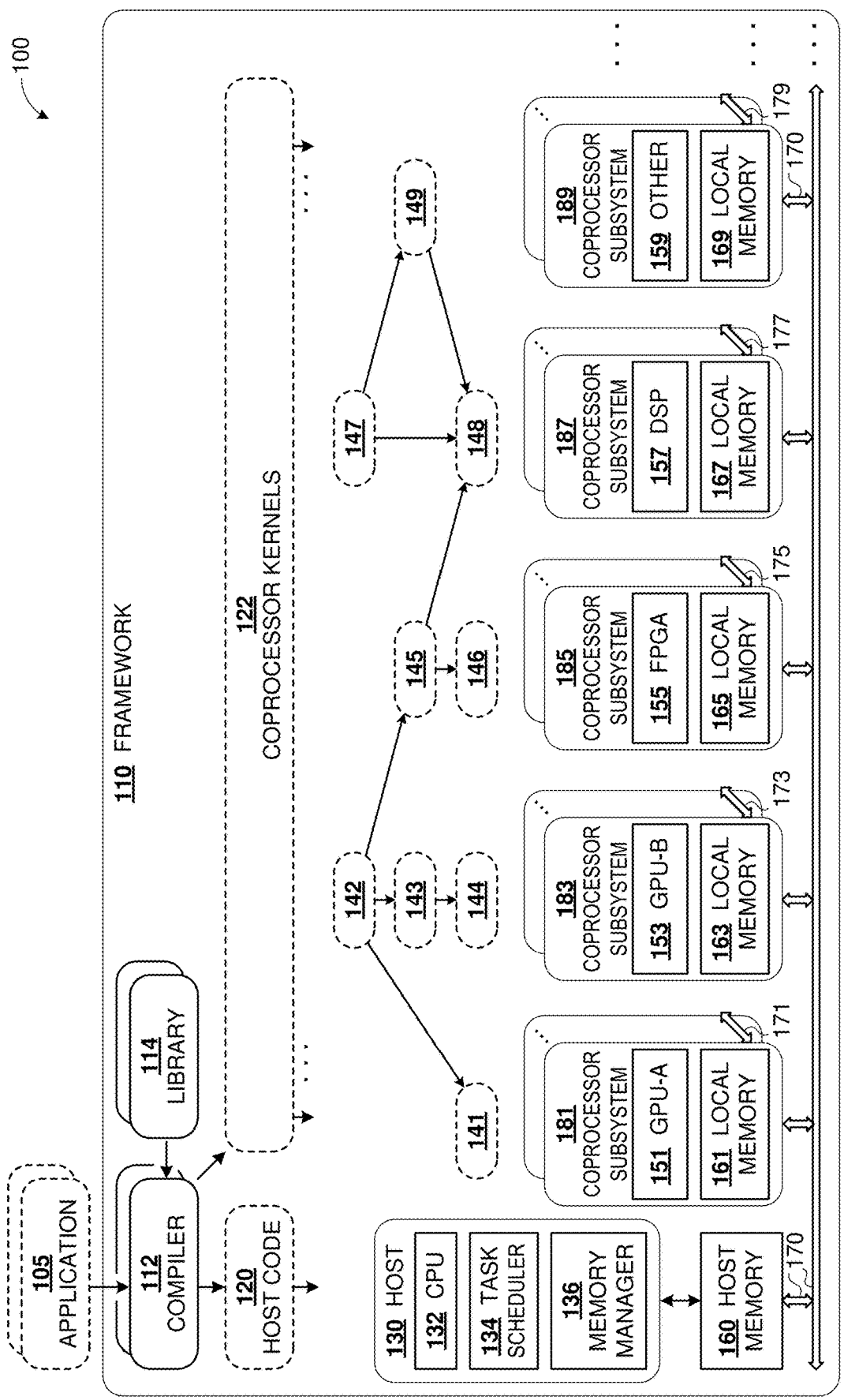
FIG. 1 is a diagram of an example heterogeneous computing framework in which disclosed technologies can be deployed.

Heterogeneous computing frameworks, such as IRIS, can encounter difficulties optimizing data transfers, in large part because the mapping of tasks to coprocessors may not be known until runtime. Consequently, hardware and software facilities for accelerated data transfers, which may not be supported on all available coprocessors, can remain unutilized. Hardware facilities can include e.g. Infiniband, CXL, or similar high performance technologies that may be supported within a particular class of coprocessor. Software facilities can include e.g. OpenMP, APIs for which may be supported on a few but not all available coprocessors.

In one aspect, the disclosed technologies can maintain validity flags indicating status of various copies of a given data object across the memories in the system. These validity flags can be used to identify a source memory, when a scheduled task requires a given data object in a given target memory.

In another aspect, the disclosed technologies can execute a policy to identify, for a given required data object, an optimum source memory from which to transfer a valid copy of that data object.

In a further aspect, the disclosed technologies memory management can complement a layer of a software stack that manages automated tiling of user software applications, providing leading edge heterogeneous computing performance with no migration required for untiled software applications.

Terminology

To facilitate review of the various embodiments, the following explanations of terms are provided. Occasionally, and where clear from the context, a term may also be used in a different meaning.

As used herein, a "computing framework" is a combination of hardware and software providing resources to an application program. Illustrative examples of a computing framework range from a personal computer (PC) running an operating system, to an extreme heterogeneous computing system configured with hardware and/or software to support the Intelligent Runtime System ("IRIS") for distributed computing.

As used herein, a "coprocessor" is a processor in a multi-processor computing environment to which tasks or computing operations can be delegated by a task scheduler, from another coprocessor, or from a host processor. Two coprocessors are a same "type" if they are functionally identical, and are different types otherwise. To illustrate, convolution accelerators having 128 and 1024 MAC units can be regarded as different types. The "class" of an accelerator indicates the underlying circuit technology or architecture with which the coprocessor is implemented. Thus, the abovementioned 128-MAC and 1024-MAC convolution accelerators can be a same class. Some classes of coprocessors of interest herein include: an application-specific integrated circuit (ASIC), comprising hard-wired circuitry customized for certain computer operation(s); a cryptoprocessor; a coarse-grained reconfigurable array ("CGRA"); a dataflow processor, such as HX300 family (Xelerated Inc., Stockholm, Sweden; Marvell Technology, Inc., Santa Clara, CA); a digital signal processor ("DSP") as commonly termed in the art, examples being SHARC series DSPs (Analog Devices Inc., Norwood MA), Qualcomm Hexagon series (Qualcomm, San Diego CA), or TMS320 series (Texas Instruments, Dallas TX); a field-programmable gate array ("FPGA"); a graphics processing unit ("GPU"); a neural network; a neuromorphic array; a systolic array; a transport control protocol ("TCP") offload engine; or a very large instruction word ("VLIW") processor.

As used herein, a "coprocessor subsystem" is a subsystem in a computing environment which includes a processing unit (the coprocessor), its local memory, and a memory controller. These constituents can be integrated in various ways in one or more integrated circuits; coprocessor subsystems are sometimes provided as peripheral circuit boards, e.g. an accelerator card. In varying examples, the memory controller can be: packaged with the coprocessor, a separate integrated circuit or, sometimes, integrated with the local memory.

As used herein, the unqualified term "data" refers to any digital representation of information.

As used herein, a "data object" is a data block or data structure in a memory, having a predefined organization. Some data objects of interest herein are rectangular arrays in two, three, or more dimensions, but this is not a requirement, and other data objects can have an irregular structure, e.g. comprising fields of different sizes. Some data objects can have a fixed size, but this is not a requirement, and other data objects can be extendable or shrinkable. A computing system can have multiple copies of a data object in respective memories. The multiple copies all map to a same data entity in an executing application program, but need not contain identical data values. (Data objects used as inputs to tasks can often contain identical data values. A data object output by a task can have different data values than other stale copies of that data object in other memories.) The most recently updated copy of the data object can be regarded as "valid" while other copies with differing data values can be regarded as "invalid". Examples of the disclosed technologies can maintain metadata to manage multiple copies of data objects. The metadata can be in the form of a directory for each data object, with entries denoting state (e.g. valid, invalid) of the data object in respective memories. Metadata entries can also serve additional functions, such as maintaining a mapping between host and local addresses, between virtual and physical addresses; or indicating size, ownership, or organization of respective data objects. Occasionally, an executing application program can encounter a new data entity, for which no data objects presently exist. In such a case, examples of the disclosed technologies can allocate storage for the data object in one or more memories, and instantiate metadata to manage copies of the data object. Metadata for a given data object can contain entries for memories which do not (yet) have storage allocated for the data object: these entries can indicate that the data object is invalid or unallocated. Some data objects can be hierarchical. For example a parent data object can represent an array of data elements, and a child data object can represent a subset of that array. In some examples, the child data objects are disjoint partitions that span the parent data object, meaning that every data element of the parent data object is part of exactly one child data object, but this is not a requirement. In other examples, child data objects can overlap, or a parent data object can have extra data (e.g. a header field) not part of any child data object. In further examples, hierarchical data objects can have two, three, or more levels. As an illustration, a parent 3-dimensional object organized as M×N×P can be decomposed into P slices (child objects) of size M×N each of which, in turn, can be decomposed into N columns (grandchild objects) of size M×1 each. A parent data object can also be decomposed into child objects of different sizes.

As used herein, "data transfer" is an operation which copies a data object from one memory to another memory. In a given computing system, multiple types of data transfers may be supported by the computing framework. Data transfers between to coprocessor subsystems generally involve the memories, memory controllers and, often, the coprocessors themselves. Nevertheless, because the transferred data originates in the memory of one subsystem and reaches the memory of the other subsystem, data transfers are described herein as memory to memory. Particularly, in a heterogeneous system, the available data transfers can vary depending on the particular combination of coprocessor subsystems (or, host memory) involved. Types of data transfer can include Cache Coherent Interconnect for Accelerators (CCIX), Coherent Accelerator Processor Interface (CAPI), Compute Express Link (CXL), Infiniband, NVLink, OpenMP, Peripheral Component Interconnect (PCI), or PCI Express (PCIe). Data transfers among two coprocessor subsystems of a same class are sometimes referred to as "in-class data transfers" herein. In some instances, a valid copy of a data object in a source memory can be marked invalid, erased, or deallocated after it has been transferred to a target memory.

As used herein, the term "heterogeneous" applies to a group of processors or a computing system having two or more distinct classes of processors. Merely as an illustration, a heterogeneous computing environment can have a general purpose central processing unit ("CPU") as a host processor and multiple GPUs as coprocessors. A computing environment having two different classes of GPUs, e.g. from different manufacturers with different architectures, has heterogeneous coprocessors. A computing environment having three or more classes of processors, with two or more classes of coprocessors, is dubbed "extremely heterogeneous." Description of heterogeneous systems herein are also applicable to extremely heterogeneous systems.

As used herein, "high performance computing" (HPC) refers to a computer system aggregating multiple computing resources under a single operating system instance to provide one, two, or more orders of magnitude more computing power than available from any single processor core in that environment. Some examples of the disclosed technologies employ a heterogeneous mix of coprocessors, and distribute computation tasks among the coprocessors, to deliver high levels of computing power with high utilization of computing resources and low power consumption. HPC applications include modeling, optimization, machine learning, artificial intelligence, or solving equations. Computer systems implementing examples of the disclosed technologies, as described herein, can be HPC systems.

As used herein, the term "homogeneous" applies to a group of processors or a computing system in which all processors available to execute application code are of a same class. A homogeneous computing system can include processors of different types within its single class. A homogeneous computing system can also include dedicated computing resources not accessible to an application program, e.g. for functions such as task scheduling, encryption, decryption, or peripheral processing (e.g. for input-output, network interface, or sensor conditioning).

Used as a countable noun herein, a "memory" is a device incorporating multiple bits of digital storage, in which data objects can be stored over respective addresses. A memory can span one or more physical integrated circuits, or can be embedded into an integrated circuit along with a processor or other functions. Some memories herein are described as "local memory" for a given or implicit coprocessor. A local memory of a processor has memory locations which are addressable by a software application running on the processor and has the lowest latency among such addressable memories. A processor cache is managed in hardware and can be invisible to the software application. A processor cache is not a local memory. In addition to lowest latency, the local memory often also has the highest bandwidth to the processor, but this is not a requirement. A local memory can be mounted on a same card as its host processor and, in some examples, can be on a same integrated circuit die or package. The term "remote memory" is applicable to any other memory in the computing environment. The term memory can also be used as an uncountable noun referring to physical digital storage embodied in one or more integrated circuits or other media; or as part of a compound noun, e.g. memory circuit or memory chip.

As used herein, a "policy" is a procedure for prioritizing data transfers. In examples, execution of a policy can identify a source memory for data transfer to a target memory, can determine corresponding data transfer instructions e.g. according to predetermined syntax rules, and can cause data transfer instructions to be executed.

As used herein, a "processor" is an apparatus implemented on one or more integrated circuits and operable to decode and execute a predetermined sequence of program instructions. As used herein, a "host" is a processor executing a program through which control, input, or supervision is provided to other computing hardware or software such as a coprocessor or a task scheduler. A host is not a coprocessor. A processor can include one or more execution units dubbed "cores". In a multi-core processor, cores can share one or more peripheral devices. That is, two cores of a multi-core processor can execute different programs independently of each other, subject to contention for any shared peripheral resources. Generally, the terms processor and core are used interchangeably herein, and description of a core can be applicable to a processor and vice versa.

As used herein, a "request" is a message to which a substantive response ("response") is expected, that is, a response beyond an acknowledgment; or a message for which a recipient of the message is expected to take a specified action. To illustrate, a task scheduler receiving a request to perform a given task on a given processor is expected to schedule the task execution and any associated data transfers. In contrast, a "notification" or a "report" need not receive a substantive response, nor result in any specific action.

As used herein, "runtime" refers to the time over which a software application is executed. In a distributed computing environment, this can include time spent scheduling and dispatching tasks of the software application. Task scheduling prior to launch of the application is considered to be performed "off-line" and is not performed in runtime.

As used herein, "schedule" and related word forms refer to temporal allocation of computing resources to each of a set of tasks or sub-tasks. To illustrate, Task A can be assigned to run on coprocessor P starting at time T1, Task B can be assigned to run on coprocessor Q starting at time T1, and Task C can be assigned to run on coprocessor P starting at time T2. The times can be absolute times according to a particular clock, or can be relative times or time slots, such that a next time slot waits for a preceding time slot to complete before commencing. Thus, "schedule" as a verb refers to the act of temporally allocating the computing resources to the tasks or sub-tasks, "scheduler" refers to a computational module (which can be implemented as a hard-wired circuit, as software executed by a processor circuit, or as any combination thereof) configured to perform scheduling, and "schedule" as a noun refers to the output of a scheduler listing the temporal allocation of the computing resources.

As used herein, the term "software" refers to computer-executable programs, instructions (sometimes "program instructions"), or associated data structures. Software can be in active or quiescent states. In an active state, software can be loaded into memory, or can be undergoing execution by one or more processors. In a quiescent state, software can be stored on computer-readable media, awaiting transmission or execution.

As used herein, a "software application" is a computer-executable program operable to perform specific functions for one or more clients or users, and can be distinct from an operating system, a software library, or a development environment. Where clear from the context, the terms "application" or "client application" refer to a software application, although "application" is also sometimes used in other meanings.

As used herein, a "task" is a discrete unit of computing work. Non-limiting examples of tasks include a convolution operation, a matrix multiplication, a search operation, a compression operation, or an encoding or decoding operation. Computation operations can include, without limitation, modifying a data item (either in memory or in a register), testing a condition of a data item, or triggering an operation by a peripheral device. Execution of a task takes time. A task commences when its first program instruction begins execution, e.g. by performing an operand fetch. A task completes when its last program instruction finishes execution, e.g. by writing a last data item of an output data object. In some examples, a task can be a portion or tile of a larger computation. A task can also be divided into sub-tasks. A sub-task is a task.

Computation problems and data objects described herein can sometimes be decomposed into regular constituent parts, each of which is termed a "tile." To illustrate, a 64×64 matrix can be decomposed into eight tiles of equal size 8×64. A corresponding computation adding two such matrices can be decomposed into eight tiles, each adding a given tile of a first matrix with a corresponding tile of a second matrix. Matrix multiplication using tiled matrices can be decomposed into a combination of computation tiles performing multiplication of data tiles, and other computation tiles summing the partial results of each tiled multiplication. LU decomposition is another common function that can be decomposed into tiles: LU (lower-upper) decomposition factorizes a square matrix into a lower triangular matrix (L) and an upper triangular matrix (U).

As used herein, the term "valid" applies to a data block whose data values are known to be correct. That is, a valid copy of a data block can be relied upon to give correct program results, while an invalid copy may or may not be up-to-date and cannot be relied upon.

As used herein, a "validity flag" is a metadata item, the value of which indicates whether a given memory has a valid copy of a given data object, or not. To illustrate, validity flag Vij can have value 1=True to indicate that memory Mj has a valid copy of data object Di, or a value 0=False to indicate that memory Mi does not have a valid copy of data object Di. As short-hand, the former case can be referred to as the validity flag indicates "valid," or the value of the validity flag is Valid. The latter case can be referred to as validity flag indicating "invalid," or value of validity flag is Invalid. In the latter case, memory Mi may not have any storage allocated for data object Di, or may have a copy of Di that cannot be relied on, because there is a possibility that another memory has a more up-to-date copy.

Example Heterogeneous Computing Framework

FIG. 1 is a diagram 100 of an example heterogeneous computing framework 110 in which disclosed technologies can be deployed. Framework 110 provides hardware and software to run applications 105. Items shown in dashed outline in FIG. 1 represent application code at least parts of which may not be part of framework 110.

Compilers 112 can parse and transform applications 112 into executable code for a host processor, host code 120 and for coprocessors, kernels 122. Both host code 120 and kernels 122 can incorporate library functions drawn from libraries 114 provided in framework 110. Thus, host code 120 and coprocessor kernels 122 contain a combination of application-specific code, which is not part of framework 110, and library functions which are. Coprocessor kernels 122 can include a pool of tasks. A given task can exist in multiple versions targeting different coprocessors.

Host subsystem 130 can include one or more CPUs 132, a task scheduler 134, and a memory manager 136. In varying examples, task scheduler 134 can be implemented as software running on a host CPU 132 or as a distinct circuit module or coprocessor, and similarly for memory manager 136. Memory manager 136 can implement certain disclosed technologies for managing copies of data objects and their associated metadata (including validity flags), for executing policies, or for determining and controlling data transfers at runtime. Host 130 can be coupled to host memory 160, which can store program code, program data, and various working data (including metadata). As illustrated, framework 110 also includes additional coprocessor subsystems 181-189, described further below. Data transfer paths 170 can be provided between host memory 160 and coprocessor subsystems 181-189.

Task scheduler 134 can organize tasks 141-149, provided from coprocessor kernels 122, to distribute and execute tasks of application 105 among a variety of coprocessors. Tasks 141-149 are shown in vertically arranged queues targeted to and drawn above respective coprocessors 151-159. Dependencies among tasks 141-149 are indicated by arrows. To illustrate, tasks 141, 143, and 145 are all dependent on results of task 142; task 148 requires results from all of tasks 145, 147, and 149; tasks 142 and 147 are not dependent on results from any other tasks.

Turning to the coprocessor subsystems 181-189, each corresponds to a different class of coprocessor 151-159. There can be zero, one, or more coprocessor subsystems 181-189 of any class shown, or additional coprocessor classes not shown in FIG. 1. Subsystem 181 incorporates GPU 151 of a class A, and its local memory 161.

GPU 151 can include multiple cores and even multiple integrated circuits, all coupled to a same local memory 161. Multiple coprocessor subsystems 181, each with a class A GPU, can support a dedicated data transfer facility 171, which can use a same or different memory bus as host memory transfers 170.

Subsystem 183 incorporates GPU 153 of class B (distinct from class A), and its local memory 163. To illustrate, GPUs 151 and 153 can be GPUs designed and manufactured by different vendors, with different data transfer facilities. Thus, while GPU 153 can support a high performance data transfer facility 173 among their memories 163, this facility 173 may not be interworkable with GPUs 151 or their associated data transfer facility 171.

Framework 110 can include additional coprocessor types. Subsystem 185 incorporates one or more FPGAs 155, with local memory 165. Subsystem 187 incorporates DSP 157 and local memory 167. Subsystem 189 incorporates coprocessor 159 of another class as described herein, together with local memory 169. In some examples, coprocessor 159 can be a general purpose CPU. Similar to the GPU subsystems 181, 183, the additional coprocessor subsystems 185, 187, 189 can also support respective specialized data transfer facilities 175, 177, 179 as shown.

Some coprocessor classes 181-189 may have an in-class data transfer facility 171-179, while others may not. It is not required that a coprocessor class support in-class data transfers. Also, if a given coprocessor class has a single instance, an in-class data transfer is moot.

Further, a given memory bus can support multiple types of data transfers. To illustrate, a host memory bus can support basic data transfers with individual addresses, direct memory access (DMA) data transfers, or OpenMP data transfers, all of which are encompassed within arrows 170, but some of these may not be supported by a given coprocessor class 181-189.

Memories 160-169 can be of various types, nonlimiting examples of which include DDR4 ($4^{th}$ generation double data rate SDRAM (synchronous dynamic random access memory)), HBM2 ($2^{nd}$ generation high bandwidth memory, a stacked form of SDRAM), or LPDDR4 ($4^{th}$ generation low-power double data rate SDRAM).

Example Data Transfer Types

Figure 2:
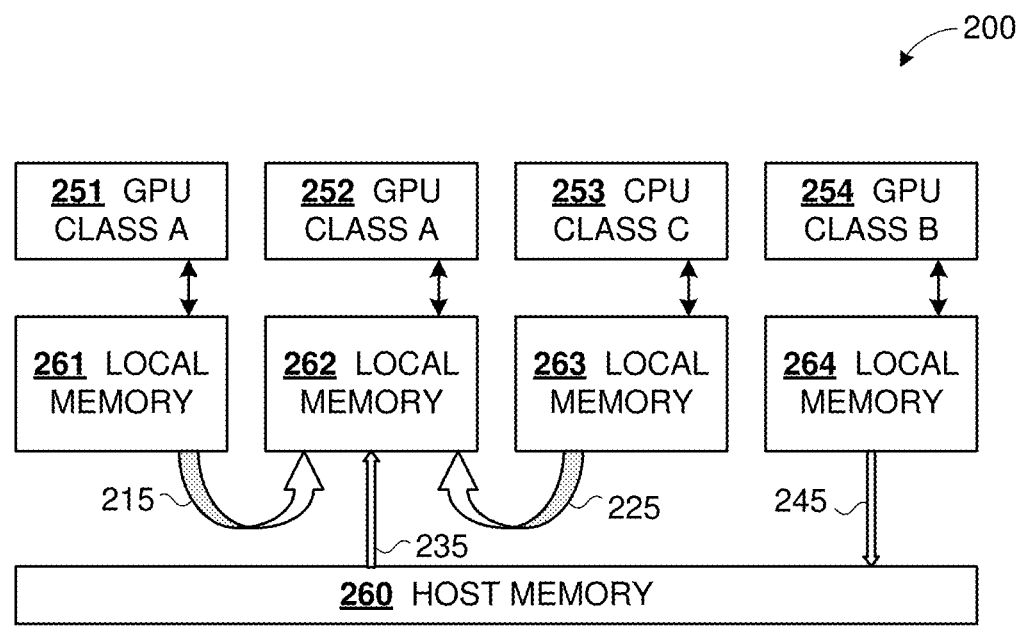
FIG. 2 is a diagram illustrating example data transfer types which can be employed in the disclosed technologies.

FIG. 2 is a diagram 200 illustrating example data transfer types which can be employed in the disclosed technologies. Coprocessors 251-254 are shown, each coupled to a respective local memory 261-264. Also shown is host memory 260. These memories can be similar to memories 160-169 described in context of FIG. 1. For convenience of illustration, various data transfers are shown directed to a same target memory 262. Generally, a data transfer type operable in one direction can also operate in the opposite direction. Moreover, many other source-target pairings can be supported by similar data transfer types, beyond those illustrated in FIG. 2.

Coprocessors 261-262 are GPUs of a same class. In some examples, these GPUs can be provisioned with hardware and firmware to support in-class data transfer (e.g. over Infiniband) as shown by arrow 215.

Coprocessor 253 is a general purpose central processing unit (CPU). Many CPUs have vector processing units which support Single Instruction Multiple Data (SIMD) instructions, making these CPUs attractive for high performance computing applications. Additionally, CPUs may be compliant with an OpenMP application programming interface (API) for data transfers between memories. OpenMP implementations for some GPUs are also available, and OpenMP data transfer can be an attractive high-performance option between compliant coprocessors, such as GPU 252 and CPU 253, as illustrated by arrow 225.

In further examples, a data object required at memory 262 may have a valid copy in host memory 260, and can be transferred to memory 262 as shown by arrow 235.

Then, certain source-target memory pairings may not support a higher performance data transfer type, and data transfer can fall back on using host memory 260 as an intermediary. That is, a data object in memory 264 can be transferred first to host memory 260 as shown by arrow 245, and then transferred to memory 262 as shown by arrow 235.

Data Objects and Data Transfers in Example Tiled Computation

Figure 3:
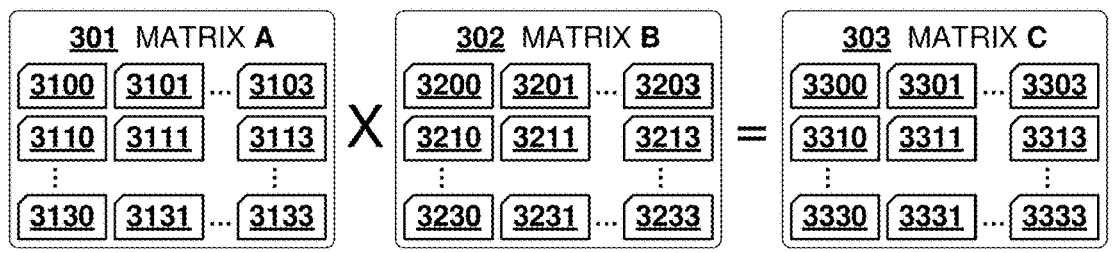
FIG. 3 is a diagram of example data objects in a tiled computation, suitable for use with the disclosed technologies.

FIG. 3 is a diagram 300 of example data objects in a matrix multiplication A×B=C, having input matrices A 301 and B 302 and output matrix C 303. These data objects are used to compare data transfers in two implementations of the matrix multiplication, shown in FIGS. 4-5.

In many applications, the matrices involved can be large, e.g. up to 16,384×16,384 or even larger. To render such an operation practical, each matrix can be decomposed into tiled data objects as shown. The size of each tile can often be in a range 8×8 to 1,024×1,024, depending on the application and the coprocessors available. Then, the required computations can be organized by tile to generate partial results, which can be combined to obtain the final result as matrix C 303.

To illustrate, a 1,024×1,024 matrix A 301 can be decomposed into 64×64 tiled data objects 3100-3133 as shown. Data objects 3100-3103 collectively contain rows 1-64 of matrix A 3101, and individually contain columns 1-64, 65-128, and 961-1024 of these rows. Rows 65-128 and 960-1024 are similarly decomposed into data objects 3110-3113 and 3130-3133 as shown.

Input matrix B 302 and output matrix C 303 can be similarly decomposed into tiled data objects 3200-3233 and 3300-3333.

Then, the multiplication A×B=C can be decomposed into computational tiles, e.g. with pairwise multiplications of one data object tile from matrix A 301 and another data object tile from matrix B 302. Particularly, data object 31rx (r, x being the row and column indices of a given data object in matrix A 301)×32xc (x, c being the row and column indices of a given data object in matrix B 302) contributes to 33rc (r, c being the row and column indices of a data object in output matrix C 303).

Data transfers to support such a tiled computation are now described with reference to FIGS. 4-5.

Figure 4:
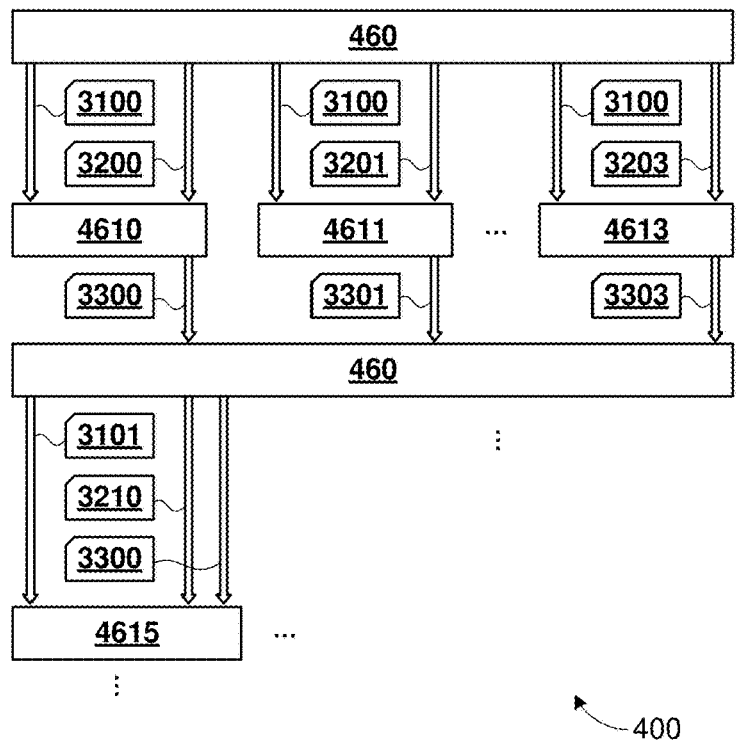
FIG. 4 is a diagram illustrating an example of conventional data transfers in a first implementation of the tiled computation of FIG. 3.

FIG. 4 is a dataflow diagram 400 illustrating some conventional data transfers in a first implementation of the tiled computation of FIG. 3. Shown are host memory 460 and local memories 4610-4613, 4615, together with several data transfers between these memories (shown as outlined arrows), annotated with the respective data objects being transferred. Each memory 4610-4613, 4615 can be local memory of a corresponding coprocessor (not shown, see FIG. 1) which can generate output data objects (which can be intermediate results) by operating on input data objects.

Initially, data object 3100 is multiplied with data objects 3200-3203 (top row of data objects in matrix B 302) to obtain partial sums of data objects 3300-3303 (top row of data objects in matrix C 303). As shown in FIG. 4, valid copies of data objects 3100, 3200 are transferred from host memory 460 (similar to host memory 160 of FIG. 1) to memory 4610. An associated coprocessor can generate an intermediate result for data object 3300, which can be transferred to host memory 460 as shown, to be available for further computations. Similarly, data objects 3100, 3201 and data objects 3100, 3203 can be transferred to memories 4611, 4613. After respective tiled computation, intermediate results for data objects 3301, 3303 can be transferred to host memory as shown.

Then, the product of data objects 3101, 3210 also contributes to data object 3300. Accordingly, all three of these data objects can be transferred to local memory 4615, with which an associated coprocessor can perform a multiply-accumulate operation to update intermediate output data object according to the formula $3300 \leftarrow 3101 \times 3210 + 3300$.

The dataflow of FIG. 4 can be continued until all partial products $31rx \times 31xc$ have been computed and accumulated into final output data objects 33rc. Notably, all data transfers in FIG. 4 are to or from host memory 460. This programming paradigm can be practical because, in a heterogeneous system, assignment of tiles to coprocessor types (and their respective local memories) may not be known until runtime. However, this approach fails to use higher performance data transfer facilities that may be available.

Figure 5:
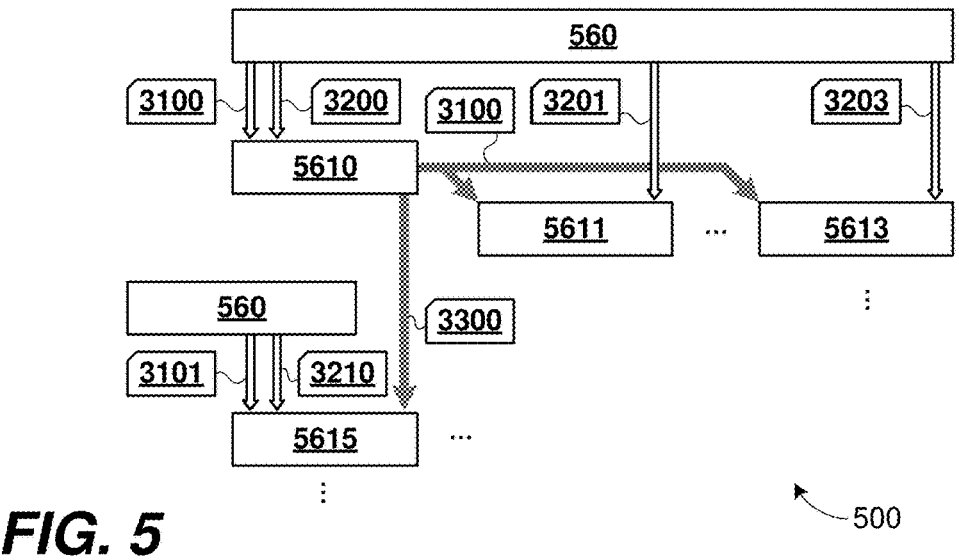
FIG. 5 is a diagram illustrating an example of data transfers, according to the disclosed technologies, in a second implementation of the tiled computation of FIG. 3.

FIG. 5 is a dataflow diagram 500 illustrating some data transfers enabled by the disclosed technologies, in a second implementation of the tiled computation of FIG. 3. Similar to FIG. 4, host memory 560 and local memories 5610-5613, 5615 are shown, together with several data transfers between these memories (shown as outlined arrows to/from host memory 560 and as solid gray arrow directly between local memories 5610-5613, 5615). Each memory 5610-5613, 5615 can be local memory of a corresponding coprocessor (not shown, see FIG. 1) which can generate output data objects (e.g. intermediate results) by operating on input data objects.

Initially, as in FIG. 4, data object 3100 is multiplied with data objects 3200-3203 (top row of data objects in matrix B 302) to obtain partial sums of data objects 3300-3303 (top row of data objects in matrix C 303). Valid copies of data objects 3100, 3200-3203 are transferred from host memory 560 (similar to host memory 160 of FIG. 1) to memories 5610-5613. Unlike FIG. 4, data object 3100 is only transferred from host memory 560 once in FIG. 5. Memories 5611-5613 can receive a valid copy of data object 3100 by higher performance data transfers directly from memory 5610. The disclosed technologies permit these data transfers (solid gray arrows) to be configured at runtime, when task allocations are known. By replacing two lower performance data transfers from host memory 560 with higher performance data transfers from local memory 5610, performance can be improved.

At local memory 5610, an associated coprocessor can generate an intermediate result for data object 3300. A next contribution to object 3300 can be scheduled on another coprocessor having local memory 5615. Data objects 3101, 3201 can be provisioned from host memory 560. However, unlike FIG. 4, data object 3300 can be transferred directly from memory 5610 to memory 5615 (shown as solid gray arrow), replacing two host data transfers (in FIG. 4) with one higher performance data transfer, obtaining additional performance improvements.

FIGS. 4-5 illustrate only four tiles of computation. The complete multiplication of FIG. 3 has each 1024×1024 matrix decomposed into a 16×16 array of tiles, each tile of size 64×64. 16 input tile pairs contribute to each output tile, so that there are a total of 16×16×16=4096 multiplication tiles. The illustrated improvements repeat and the aggregated performance improvement grows quickly. Significant computational speed-up can be achieved.

Example Metadata

Figure 6:
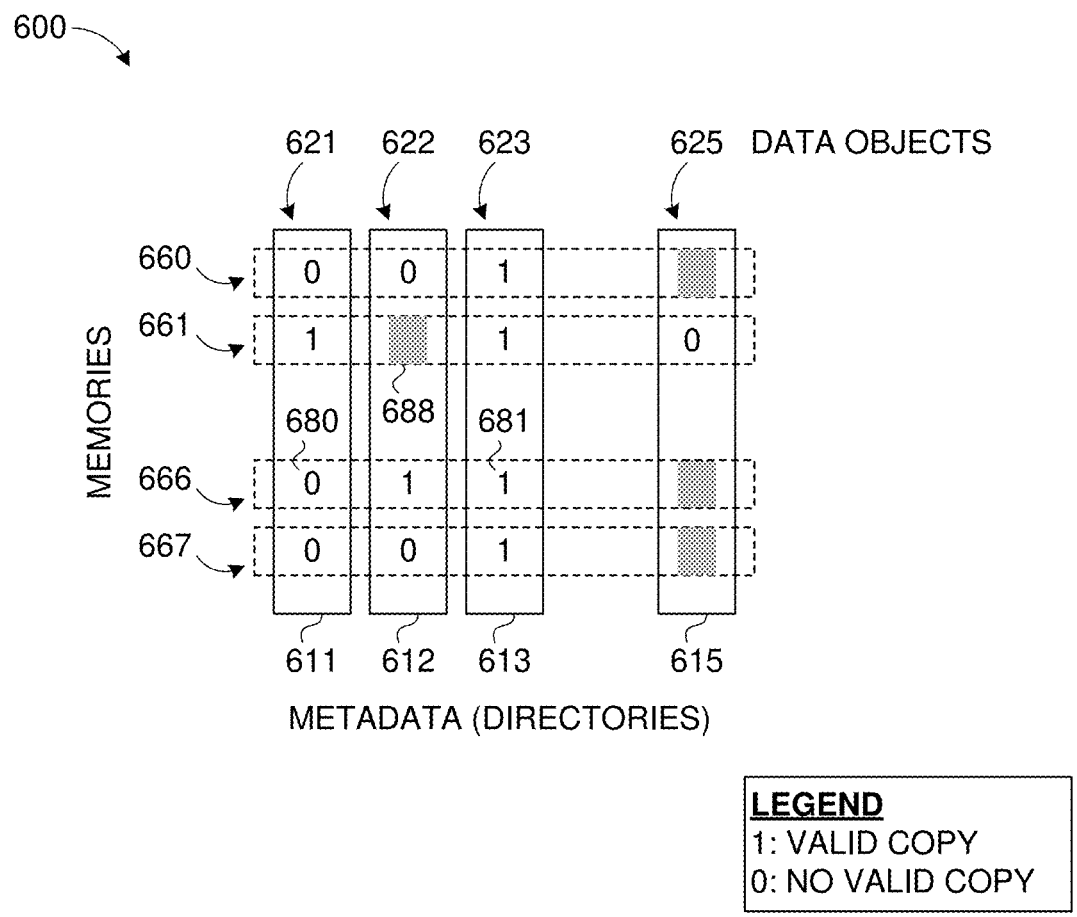
FIG. 6 is a diagram illustrating an example of metadata storing validity flags for respective data objects according to the disclosed technologies.

Examples of the disclosed technology can maintain metadata to assist with managing multiple copies of data objects distributed among respective memories. FIG. 6 is a diagram 600 illustrating an example of metadata storing validity flags for respective data objects according to the disclosed technologies.

Metadata directories 611-615 are depicted for respective data objects 621-625. Each metadata directory contains entries (e.g. 680, 681) corresponding to respective memories. For convenience of illustration, metadata entries in FIG. 6 are shown arranged according to the associated memory 660-667. Thus, the dashed rectangles in FIG. 6 group together metadata entries for corresponding memories 660-667 as marked.

In this simplified example, only one element of each metadata entry is shown, which is a binary-valued validity flag. A "1" indicates that the corresponding memory has a valid copy of the instant object, while a "0" indicates that the corresponding does not have a valid copy of the data object. To illustrate, data object 621 has a valid copy in memory 661, and does not have valid copies in the other memories shown.

Metadata directory 612 shows that data object 622 has a valid copy in memory 666, no valid copy in memories 660, 667. Metadata 612 has no entry for memory 661, as shown by gray rectangle 688. To illustrate, some data objects can be associated with particular computation tiles, which can be known a priori to be restricted to certain coprocessors and their local memories. In examples, storage requirements for metadata directories can be reduced by limiting metadata entries to allowed memories for a corresponding data object.

Metadata 613 indicates that data object 623 has valid copies in all memories 661-667 shown, which can be the case for data objects that are used as common input to multiple computation tiles.

Metadata 615 has a single entry for memory 661, which indicates "Invalid." Absence of any valid copy can occur when a single coprocessor is tasked with performing e.g. multiply-accumulate tiled computation. During computation, an output data object tile can be in a state of flux. Because copying this data object can predictably lead to erroneous results, it can be marked Invalid.

Numerous variations and extensions can be implemented within scope of the disclosed technologies. In some examples, the validity flag value "0" can represent either an invalid copy or no allocated storage for the data object. In other examples, an additional state of the validity flag can be introduced, to distinguish an invalid copy ("0") from no copy ("X"). A further state ("A") of the validity flag can indicate that the given copy is in process of being updated, and can become a valid copy once the associated computational tile completes. This can facilitate early generation of data transfer commands, to be executed after that tile completes and the copy of the instant data object becomes Valid.

Multiple metadata directories can be combined as a single data structure, e.g. in the form of a two-dimensional table indexed by data object and memory. Metadata entries can include other information, as described herein.

First Example Method

Figure 7:
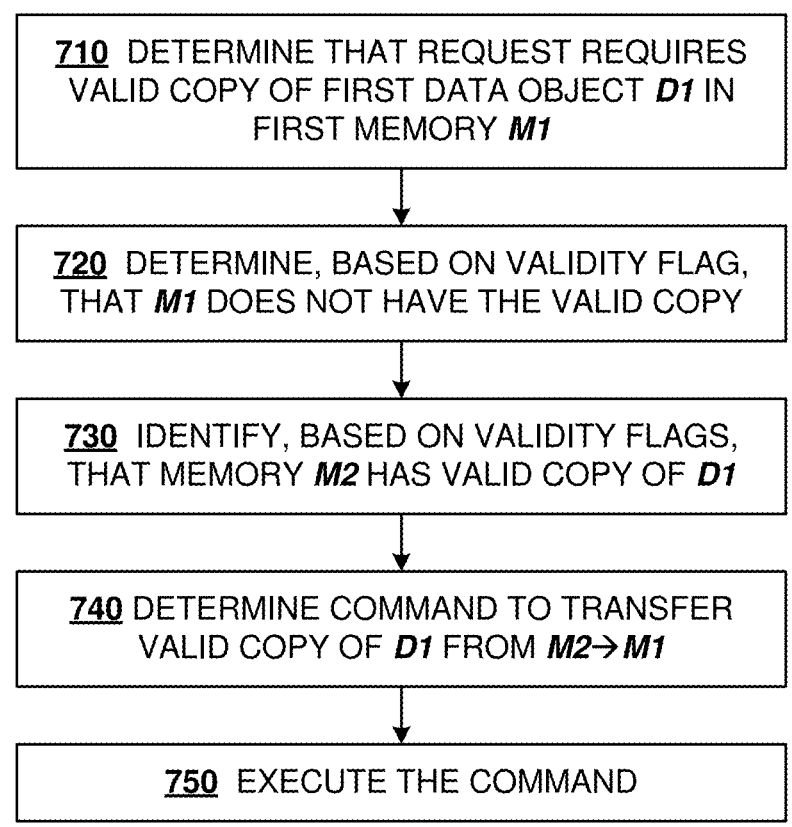
FIG. 7 is a flowchart of a first example method according to the disclosed technologies.

FIG. 7 is a flowchart 700 of a first example method according to the disclosed technologies. In this method, validity flags are used to find a valid copy of a required data object and copy it where needed. The method can be performed by a memory manager, task scheduler, or other software component in a distributed computing framework. In examples, the framework can implement the Intelligent Runtime System (IRIS). The method can be executed by a host processor or by a specialized circuit module within the framework.

At process block 710, a determination can be made that a received request requires a valid copy of a first data object D1 in a first memory M1. To illustrate, the request can be a message or command to a supervisory module for executing a task on a coprocessor having local memory M1. As another illustration, the request can be a request to a memory manager specifically asking for data object D1 to be provisioned in memory M1.

The framework can provide metadata, associated with data object D1, including validity flags for each of multiple memories, each validity flag indicating whether the respective memory has a valid copy of data object D1. For example, validity flag $V_{ij}$ can indicate whether memory $M_j$ has a valid copy of data object $D_i$.

At process block 720, a determination can be made, based on validity flag V11, that memory M1 does not have the valid copy of data object D1 as required. To illustrate, a test of validity flag V11 can indicate that its value is 0=False.

At process block 730, a second memory M2 can be identified as having a valid copy of object D1. This identification can be based on examination of other validity flags $\{V1j\}$ for $j \neq 1$. To illustrate, V12 can be found to have the value True.

At process block 740, a command to transfer the valid copy of DI from memory M2 to memory M1 can be determined. For example, the command can be constructed according to syntax rules defined for the framework. Unlike some conventional methods where the data transfer command is determined before tasks have been distributed among coprocessors and their respective memories, process block 740 can be performed at runtime, when task and memory assignments are known, to achieve superior performance. The command determined at block 740 can be executed at process block 750.

Numerous variations and extensions can be implemented within scope of the disclosed technologies. For example, execution of block 740 at runtime allows utilization of the most efficient data transfer facility available between M2 and M1. To illustrate, a in-class coprocessor-to-coprocessor transfer can be executed in preference to data transfer types host→coprocessor, or coprocessor→host→coprocessor. Moreover, when multiple source memories are available, memory M2 can be selected on the basis of having the best available coupling (e.g. best latency or total time) to memory M1. In the context of FIG. 2, if all memories 260, 261, 263, and 264 have valid copies of a data object needed by memory 262, then memory 261 can be selected as memory M2 because the total transfer time of data transfer 215 is less than the other data transfers described for FIG. 2. In general, the source memory or the data transfer facility can be chosen according to a policy, as described further herein. In some examples, the received request can specify a task T1 scheduled to be executed on a coprocessor C1 having local memory M1. The data object D1 can be an input to task T1. Execution of task T1 can generate a second data object D2 in memory M1. Then, responsive to the received request, validity flags $\{V2j\}$ can be set to False (indicating invalid) for $j \neq 1$ (i.e. for some memories other than M1). Additionally, validity flag V21 can be set to False (invalid) prior to commencement of task T1, and can be set to True (valid) upon completion of task T1. In some cases, data object D2 can be newly instantiated by execution of task T1. In such case, prior to execution of task T1, storage for object D2 can be allocated in memory M1 and metadata (including validity flags $\{V2j\}$) can be instantiated for object D2.

The first method can be implemented in a heterogeneous computing framework, such as IRIS. The framework can be similar to 110 of FIG. 1.

The method can extend to maintaining the metadata (including validity flags) of multiple data objects for multiple memories. Each object's metadata can be a directory having entries for respective ones of the memories, each entry comprising a validity flag indicating whether the respective memory has a valid copy of the corresponding data object.

Example Method Implementing Policy Logic

Figure 8:
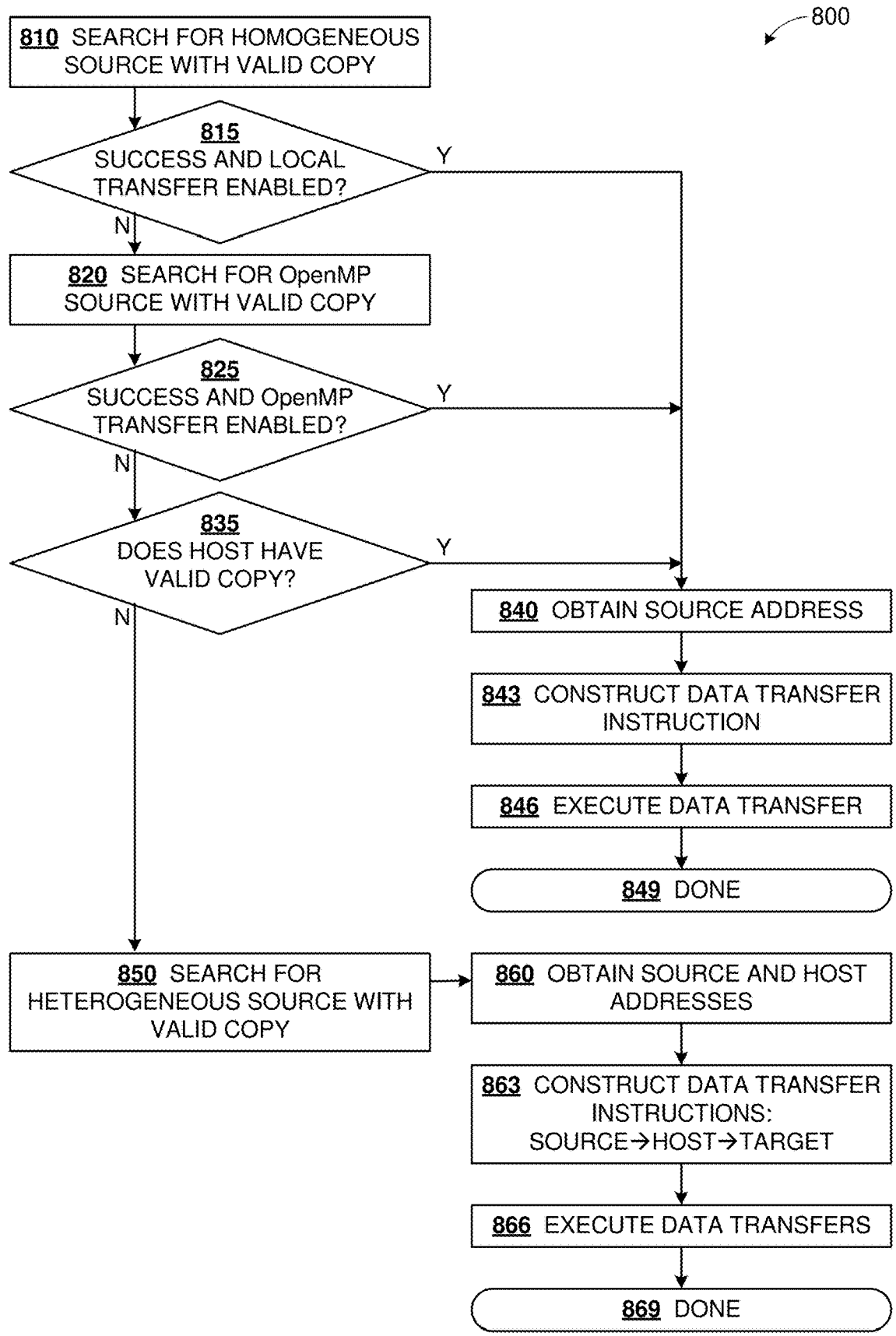
FIG. 8 is a flowchart of a second example method according to the disclosed technologies.

FIG. 8 is a flowchart 800 of a second example method implementing policy logic for prioritizing data transfer types and dynamically determining data transfer commands, e.g. at runtime, to provide a valid copy of a data object where needed. In varying examples, this method can be executed by a memory manager (similar to 136 of FIG. 1), by a task scheduler (similar to 134), or pushed down to a coprocessor (similar to 159) as a prerequisite to performing its assigned computation task (which uses the instant data object as input).

The method begins when a need has been identified for a valid copy of a given data object at a given target memory. At block 810, a search can be performed to find a homogeneous source memory having a valid copy of the given data object. The term "homogeneous source" means that the source memory and target memory are local to a same coprocessor class. In this example, data transfers within a given coprocessor class, where available, can have highest performance (among data transfer types) and can therefore have the highest priority. At decision block 815, the result of block 810 can be tested, and a check can be made whether local transfer between the homogeneous source and target memories is available. If yes, the method proceeds via the Y branch from decision block 815 to block 840. Otherwise, the method proceeds via the N branch to block 820.

At process block 820, a search can be performed to find an OpenMP source having a valid copy of the given data object. The term "OpenMP source" means that the source memory is local to a coprocessor supporting OpenMP data transfers. OpenMP transfers are available for many general purpose CPUs and some GPUs. In varying examples, the target memory can be a GPU or a CPU and, similarly, the source memory can also be CPU or GPU. That is, the OpenMP data transfer can variously support data transfers between CPU coprocessors, from CPU to non-CPU, from non-CPU to CPU, or between two non-CPU coprocessors. At decision block 825, the result of block 820 can be tested, and a check can be made whether OpenMP data transfer is available from the OpenMP source to the target memory. If yes, the method proceeds via the Y branch from decision block 825 to block 840. Otherwise, the method proceeds via the N branch to block 835. In this example, OpenMP data transfer has performance in between homogeneous transfer and host memory transfer, which is reflected in the ordering of decision blocks 815, 825, 835.

At decision block 835, a determination can be made whether host memory has a valid copy of the given data object. If yes, the method proceeds via the Y branch from decision block 835 to block 840. Otherwise, the method proceeds to block 850.

The portions of flowchart 800 discussed above can lead to process block 840 through multiple paths, each of which identifies a suitable source memory. At block 840, an address of the data object in the source memory can be obtained and, at block 843, a data transfer instruction can be constructed. The data transfer can be executed at block 846, following which the method is done, at block 849.

At block 850, a search can be performed to find a heterogeneous source memory having a valid copy of the given data object. The term "heterogeneous source" means that the source memory and target memory are local to different classes of coprocessors. In this example, data transfers between such memories, where OpenMP is not available, are the lowest performance among the instant data transfer types, and such data transfers are accorded the lowest priority in this method. In this example, these data transfers can be implemented in two stages, first a transfer from the source memory to a host memory, followed by a second transfer from the host memory to the target memory. Accordingly, at block 860, data object addresses in the source memory and the host memory can be obtained. At block 863, data transfer instructions can be constructed for both transfers:

source-to-host, and host-to-target. Then, at block 866, the data transfers can be executed in that order, following which the method is done, at block 869.

In many examples, there can be at least one copy of a data object that is either valid or that will become valid when a prior computation task completes. The latter situation can arise in any of the data transfer types discussed. Accordingly, the method can block at any point before execution of the corresponding data transfer, so that the source data object becomes valid before the data transfer is executed.

Numerous variations and extensions of the second method can be implemented within scope of the disclosed technologies. In some examples, a test for availability of a given data transfer type can be made before performing a search for the corresponding type of source memory (e.g. homogeneous source or OpenMP source). Other data transfer types (e.g. CXL) or policies can be implemented.

Example Hierarchical Data Object

Figure 9:
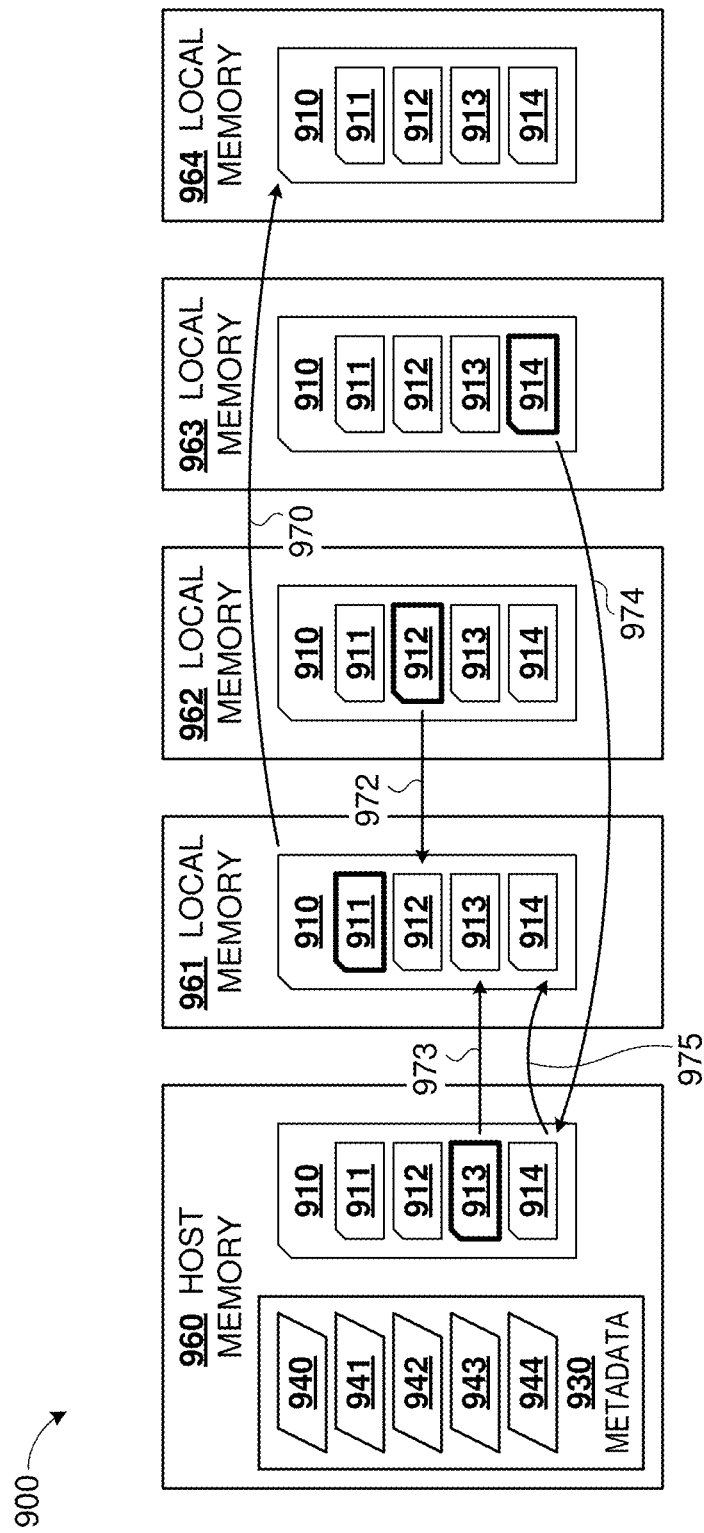
FIG. 9 is a diagram illustrating an example of a hierarchical data object according to the disclosed technologies.

FIG. 9 is a diagram 900 illustrating usage of a hierarchical data object, namely a parent data object 910 which can be decomposed into constituent parts, namely child data objects 911-914. Five exemplary memories are shown in FIG. 9: host memory 960 (similar to 160 of FIG. 1), and local memories 961-964 (similar to memories 161-169 of FIG. 1). As illustrated, each of memories 960 have allocated storage for parent object 910, which implies allocated storage for its parts 911-914, but this is not a requirement.

In other examples, a given local memory can have storage allocated for only one or more of child data objects 911-914, or for none at all. Host memory 960 also stores a metadata pool 930, containing directories 940-944 for respective data objects 910-914. Particularly, metadata directory 944 can store entries for each of memories 960-964, each entry containing a validity flag indicating whether the corresponding memory has a valid copy of data object 914. Metadata entries 940-943 can be similar.

Initially, child data objects 911-914 can be computed by respective tasks executed on respective coprocessors. For example, child data object 911 can be computed on a coprocessor associated with memory 961, and stored by that coprocessor in its local memory 961. For purpose of illustration, the copy of object 911 in memory 961 is depicted with bold outline to indicate that this is the original valid copy of data object 911. Copies of data object 911 in memories 960, 962, 963 can be invalid. The valid/invalid statuses of these copies of object 911 can be maintained in validity flags in metadata directory 941. Particularly, the respective validity flags of memories 960-964 can be 0, 1, 0, 0, 0 to indicate that only memory 961 has a valid copy of child object 911.

Similarly, child objects 912, 913, 914 can be respectively computed and stored in memories 962, 960, 963, as shown by the bolded outlines for some of these data objects. Correspondingly, the validity flags of data object 912 can be 0, 0, 1, 0, 0; and similarly for data objects 913, 914. At this point, none of the memories shown has a valid copy of parent data object 910, and the validity flags in its directory 940 can be 0, 0, 0, 0, 0.

In this illustration, a downstream task can require parent data object 910 in memory 964. In examples, the child data objects can be gathered in a single memory such as 961. A valid copy of data object 912 can be transferred from memory 962 to memory 961 as shown by arrow 972. Data transfer 972 can be an in-class coprocessor-to-coprocessor transfer. Following this transfer, the validity flags of object 912 can be updated from 0, 0, 1, 0, 0 to 0, 1, 1, 0, 0, reflecting the presence of valid copies of object 912 in both memories 961-962. The validity flags can be updated and maintained by a memory manager (similar to 136 of FIG. 1).

A valid copy of child object 913 can be transferred from host memory 960 to memory 961 as shown by arrow 973, which can be an OpenMP data transfer.

A valid copy of child object 914 can be transferred from memory 963 to 961 indirectly via host memory 960 (arrows 974-975), which can occur if memories 961, 963 do not support any higher performance data transfer with each other. In this case, the validity flags in directory 944 can be updated from 0, 0, 0, 1, 0 to 1, 1, 0, 1, 0, because both memories 960-961 have received valid copies of child object 914. Child object data transfers 972-974 can be executed sequentially or in parallel, in any combination.

At this point, memory 961 has valid copies of all child data objects 911-914, enabling a memory manager (136) to update the validity flags of parent object 910 to 0, 1, 0, 0, 0. Parent object 910, now valid in memory 961, can be transferred directly or indirectly (arrow 970) to memory 964 to fulfill its requirement for a valid copy of object 910. Then, the validity flags of object 910 can be updated to 0, 1, 0, 0, 1.

Numerous variations and extensions of the second method can be implemented within scope of the disclosed technologies. Additional hierarchical levels can be supported. To illustrate, one or more of child objects 911-914 can be decomposed into another level of child data objects. Parent data object 910 can itself be a child of a larger data object. As an alternative to assembling a valid copy of object 910 in memory 961, all child objects can be transferred to memory 964 directly. The data transfer type used for any of data transfers 970-974 can be determined according to a policy.

Example Methods with Hierarchical Data Objects

Figures 10, 11:
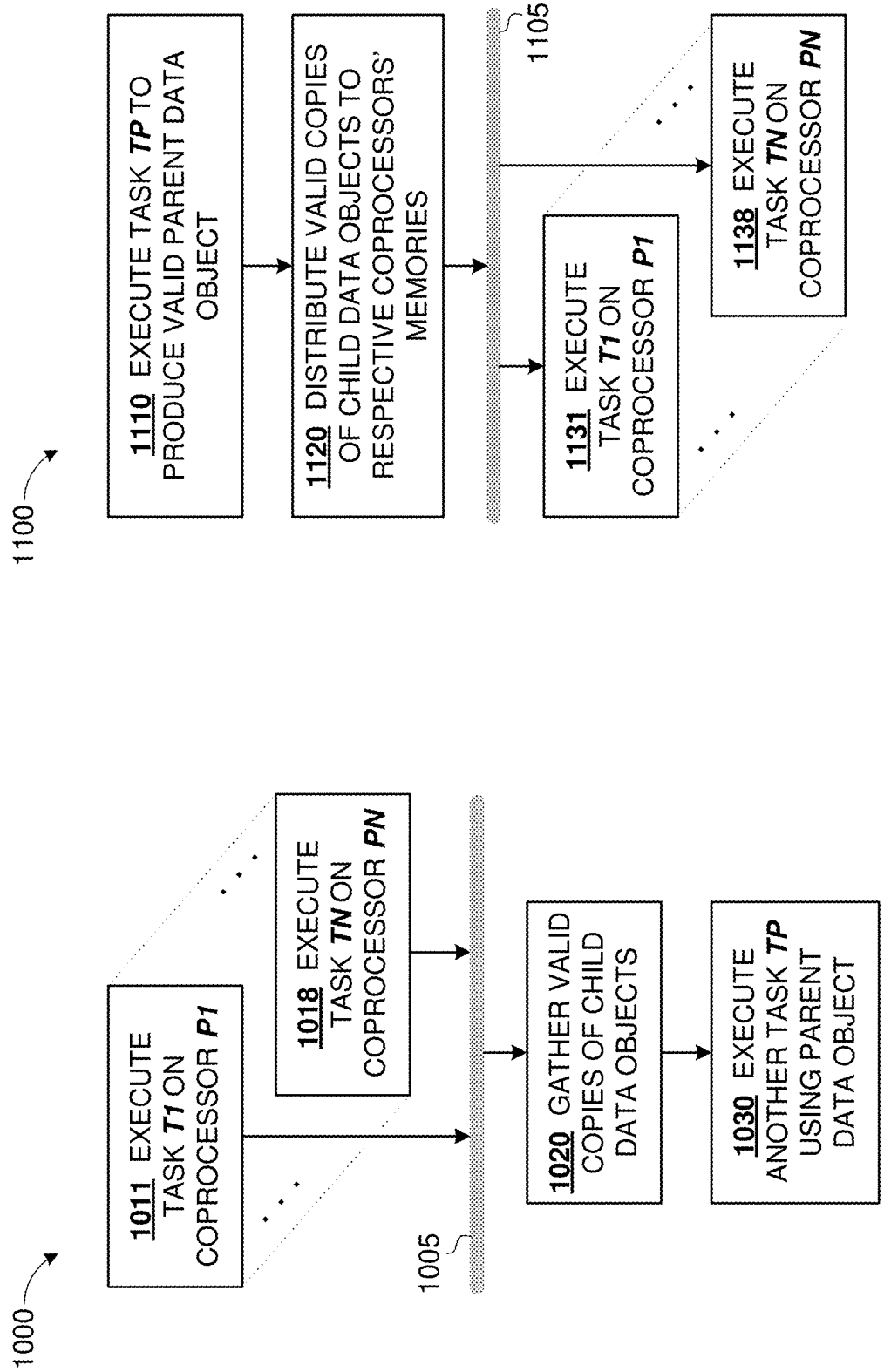
FIG. 10 is a flowchart of a third example method according to the disclosed technologies.
FIG. 11 is a flowchart of a fourth example method according to the disclosed technologies.

FIG. 10 is a flowchart 1000 of a third example method, for handling hierarchical data objects. In this example, valid child data objects can be combined to create a valid parent data object. This method can be implemented in conjunction with the first method, e.g. in a distributed computing environment.

At process blocks 1011-1018, tasks T1-TN can be executed on coprocessors P1-PN, thereby generating respective child data objects in respective local memories M1-MN. When all tasks T1-TN have completed, join 1005 is satisfied, and the method proceeds to block 1020, where data transfers are executed to gather valid copies of the several child data objects in a common memory Mi, so that memory Mi contains a valid copy of a parent data object comprised of the child data objects. In some examples, all child data objects can be copied to memory Mi while, in other examples, valid copies of one or more of the child data objects may already be present in memory Mi, reducing the number of required data transfers correspondingly.

Then, at block 1030, another task TP can be executed using the parent data object as input.

Numerous variations and extensions of the second method can be implemented within scope of the disclosed technologies. For example, the data transfer operations of block 1020 can be performed independently as each block 1011-1018 completes, prior to join 1005.

FIG. 11 is a flowchart 1100 of a fourth example method, for handling hierarchical data objects. In this example, valid child data objects are distributed from a valid parent data object. This method can be implemented in conjunction with the first method, e.g. in a distributed computing environment.

At process block 1110, task TP can be executed to produce a valid copy of a parent data object. At block 1120, valid copies of child data objects (each a part of the parent data object) can be distributed to respective memories, each associated with a respective coprocessor P1-PN. The method reaches fork 1105, following which blocks 1131-1138 execute respective tasks T1-TN on coprocessors P1-PN, using the distributed valid copies of the child data objects as inputs.

Numerous variations and extensions of the second method can be implemented within scope of the disclosed technologies. For example, the data transfer operations of block 1120 can be performed after fork 1105, independently for each task T1-TN.

Example Task Preparation Logic

Figure 12:
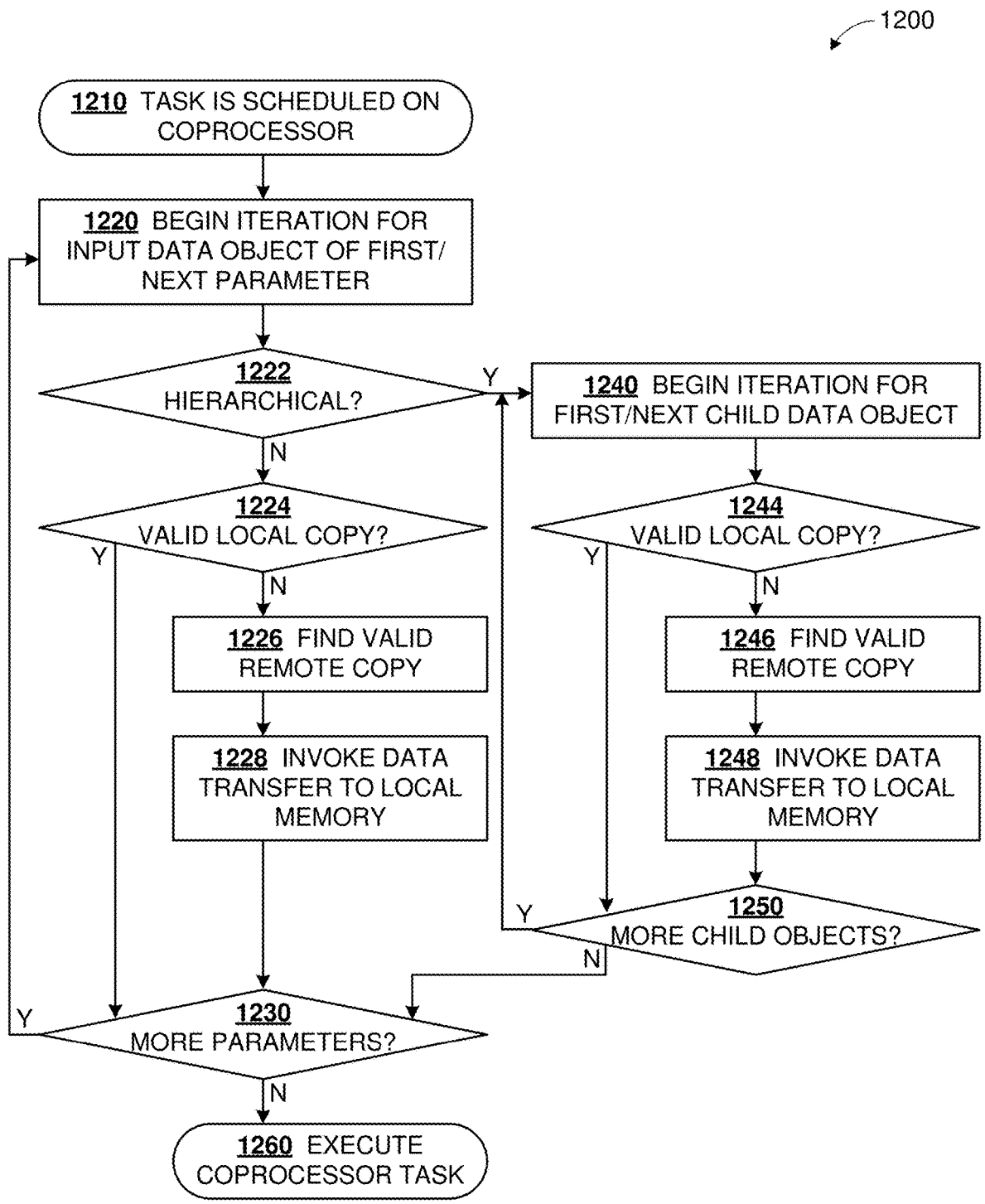
FIG. 12 is a flowchart of a fifth example method according to the disclosed technologies.

FIG. 12 is a flowchart 1200 of a fifth example method for preparing input data required by a task. In this method, data objects required as input to the task are transferred to local memory if valid local copies are not already present. This method can be performed by, or under control of, a task scheduler (similar to 134 of FIG. 1), a memory manager (136) or a coprocessor (151-159) on which the task is scheduled to execute.

The method begins at block 1210 when it is known that an instant task is scheduled on a particular coprocessor. In varying examples, a task scheduler performing the method can schedule the task to trigger the method, a memory manager can receive a message indicating that the task has been scheduled, or a coprocessor can receive a task assignment from the task scheduler.

The method enters an iterative loop (1220-1230) and begins an iteration at process block 1220. A first iteration pertains to a first input parameter required by the task and subsequent iterations pertain to a next input parameter, one at a time. Each input parameter can be associated with a corresponding data object. At block 1220, this data object can be identified, along with any associated metadata.

At decision block 1222, the data object or its metadata can be checked to determine if the data object is hierarchical. If yes, the method follows the Y branch from block 1222 to process block 1240. Otherwise, the method follows the N branch from block 1222 to decision block 1224, where a determination is made whether an instant local memory (e.g. the local memory associated with the coprocessor scheduled to execute the instant task) already contains a valid local copy of the data object, for example by testing a value of a corresponding validity flag as described herein. If a local valid copy is present, the method follows the Y branch from decision block 1224 to decision block 1230. Otherwise, the method follows the N branch from decision block 1224 to process block 1226, where a valid remote copy can be found. At block 1228, a data transfer can be invoked to provide a valid copy of the required input data object in the instant local memory, after which the method proceeds to block 1230. In examples, blocks 1226 and 1228 can be performed by executing a predetermined policy, in a similar manner as described in context of FIG. 8.

At decision block 1230, a determination can be made whether any more input parameters remain to be processed. If yes, then the method can follow the Y branch from block 1230 to block 1220 for another iteration. If no, then input data preparation is complete, and the method can follow the N branch to block 1260 for execution of the task.

The description turns to hierarchical data objects, which are handled by another iterative loop (1240-1250). Each iteration beginning at block 1240. A first iteration pertains to a first child of the instant (parent) data object and subsequent iterations pertain to a next child data object, one at a time. At block 1240, the current child data object can be identified, along with any associated metadata.

At decision block 1244, a determination can be made whether the instant local memory already contains a valid local copy of the child data object, for example by testing a value of a corresponding validity flag as described herein. If a local valid copy is present, the method follows the Y branch from decision block 1244 to decision block 1250. Otherwise, the method follows the N branch from decision block 1244 to process block 1246. At block 1246, a valid remote copy can be found and at block 1248 a data transfer can be invoked to provide a valid copy of the required child data object in the instant local memory, after which the method proceeds to block 1250. In examples, blocks 1246 and 1248 can be performed by executing a predetermined policy, which can be a same policy as used for blocks 1226 and 1228.

At decision block 1250, a determination can be made whether any more child data objects remain to be processed.

If yes, then the method can follow the Y branch from block 1250 to block 1240 for another iteration. If no, then all child objects of the current input parameter have been processed, and the method can follow the N branch to block 1230 to check if additional parameters remain to be processed.

Numerous variations and extensions of the second method can be implemented within scope of the disclosed technologies. For example, the method can be extended to additional levels of hierarchy, with successively nested iterative loops similar to loop 1240-1250. In further examples, the iterative loops can be parallelized, with multiple input parameters or child data objects processed in parallel, e.g. by respective threads.

Example Performance

A series of experiments were performed on a heterogeneous system having a Cray system (manufactured by Hewlett-Packard Enterprise Co., Spring, TX) as a host platform, augmented with four A100 GPUs (e.g. coprocessor class A; manufactured by Nvidia Corp., Santa Clara, CA) and four MI100 GPUs (e.g. coprocessor class B; manufactured by Advanced Micro Devices, Inc., Santa Clara, CA), and provisioned with IRIS. The coprocessors are connected to the host over PCIe busses. The experiments tested two benchmark applications, matrix multiplication using tiled DGEMM (Double Precision General Matrix Multiplication) from the IRIS-BLAS (Basic Linear Algebra Subprograms) library, and LU Factorization from the LaRIS library. All tests were performed on N×N square matrices, with varying N. The tested applications are decomposed into interrelated tasks forming a task graph, and total execution time of the task graph was measured as an indicator of performance-lower execution time being better.

Figure 13:
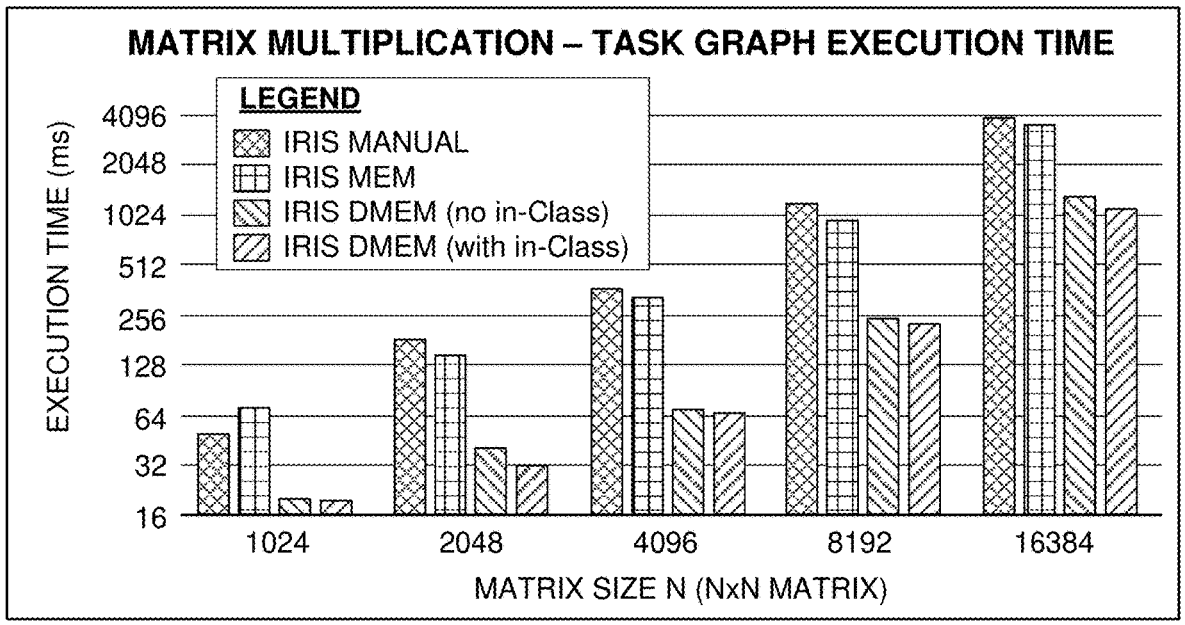
FIG. 13 is a chart demonstrating performance of the disclosed technologies in an example matrix multiplication computation.

FIG. 13 is a chart 1300 demonstrating performance of the disclosed technologies on the matrix multiplication application. Four techniques were compared for matrix sizes varying from 1024×1024 to 16,384×16,384. The baseline case is IRIS-MEM, using the default automatic memory manager in the IRIS framework. To its left are shown results for manually coded data transfers (IRIS MANUAL), and to the right are shown two configurations for the dynamic memory management disclosed herein (IRIS DMEM). On the extreme right is the configuration (IRIS DMEM with in-Class) including all high-performance data transfers within a coprocessor class, e.g. those described in context of 171 (FIG. 1) or 215 (FIG. 2) herein. In the second from right position is the configuration (IRIS DMEM no in-Class) in which OpenMP data transfers (225) are enabled but in-class transfers (215) are disabled. Execution time is plotted on a logarithmic scale.

The results show a consistent speed-up ranging from 3× to 5× over all tested data sizes. The average speed-up of IRIS DMEM (with in-Class) relative to IRIS-MEM is 4.1× for the matrix multiplication benchmark. The use of in-class data transfers is seem to have only a small impact on execution time-about 10%. Similarly, manual coding of data transfers has only a modest impact, and sometimes performs worse than the baseline IRIS MEM technique. Together, these results suggest that the bulk of performance improvement lies from dynamically determining data transfers when task-to-coprocessor mapping is known. The use of in-class data transfers provides a consistent performance gain, albeit smaller.

Figure 14:
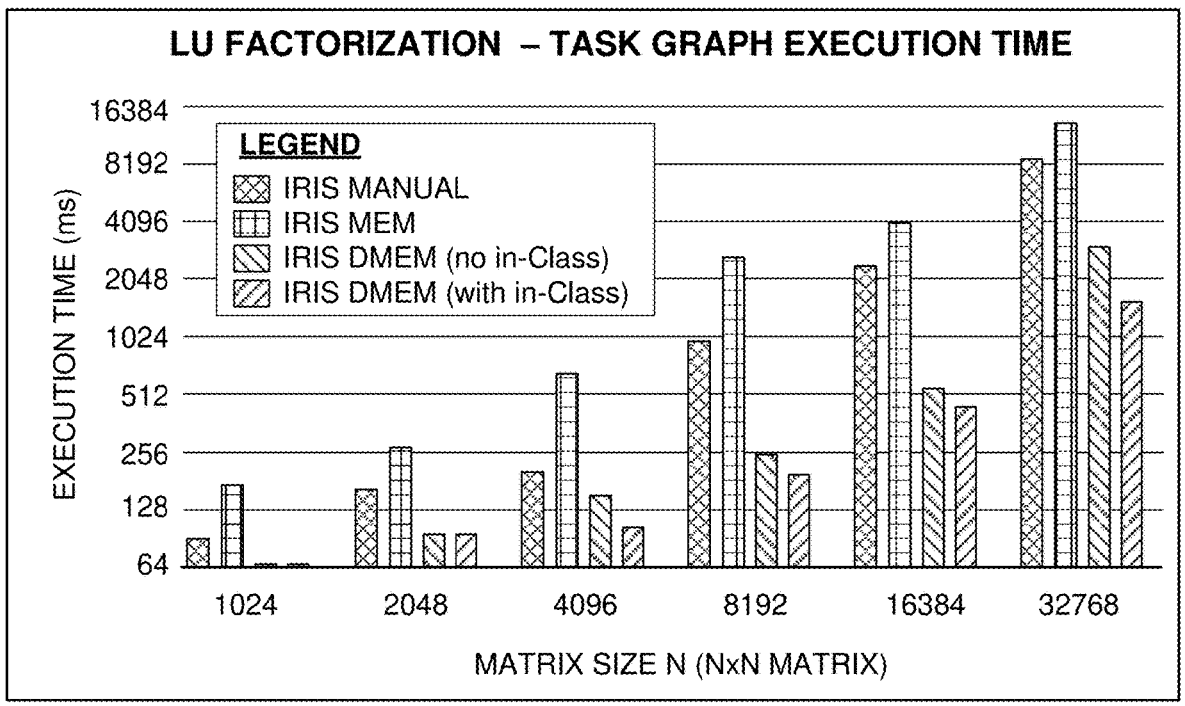
FIG. 14 is a chart demonstrating performance of the disclosed technologies in an example LU factorization computation.

FIG. 14 is a chart 1400 demonstrating performance of the disclosed technologies in an example LU factorization computation. The same four techniques are compared as for FIG. 13, with matrix sizes varying from 1024×1024 to 32,768× 32,768. For this benchmark, the IRIS DMEM improvements vary with matrix size, from about 2.8 to about 13.6—the average speed-up IRIS DMEM (with in-Class) relative to IRIS-MEM is 7.2×. Manual coding is also superior to IRIS MEM, but by lesser amounts than either of the IRIS DMEM techniques. For this benchmark, the use of in-class transfers provides greater, but still secondary, improvements, up to about a factor of 2 better than IRIS DMEM (no in-Class).

The disclosed technologies have also been benchmarked against competitive heterogeneous computing frameworks such as StarPU, supported by e.g. National Institute for Research in Digital Science and Technology ("Inria"), France, and MAGMA, supported by e.g. University of Tennessee, Knoxville. The disclosed technologies have demonstrated 2.1× MAGMA's performance, and have also surpassed StarPU by a more modest 9.5%.

Example Software Stack

In existing IRIS deployments, an IRIS-BLAS layer provides tiled implementations of common linear algebra functions. Examples of the disclosed technologies can introduce an abstraction layer (dubbed "MatRIS") between a software application and an IRIS-BLAS layer. The MatRIS layer exposes a tiling independent application programming interface (API) to a user's software application, performs automatic and dynamic tiling of the software application, and in turn invokes tiled kernels in the IRIS-BLAS library.

The MatRIS layer can also incorporate LAPACK (Linear Algebra Package) functionality, so that a user software application that calls LAPACK routines can be ported to MatRIS without source code modification, to obtain superior performance.

As part of tile decomposition, the MatRIS layer can also generate a task graph and data dependency information, and can support performance models to guide task scheduling. The MatRIS layer can also support reconstruction of tiled computation results to the (untiled) user software application.

While the dynamic tiling provided by the MatRIS layer is not dependent on dynamically determined data transfers as described herein, the two technologies are complementary, and MatRIS together with dynamic data transfers can outperform other competing frameworks. In tests, these combined technologies offer 5× to 8× speedups over a conventional framework. a substantial part of the speedup being due to a reduction in data transfers by about 3× to 5×, e.g. with utilization of high-performance in-class transfers between coprocessors.

Additional Examples

The following are still further examples of the disclosed technologies.

Example 1 is one or more computer-readable media storing instructions which, when executed by one or more hardware processors, cause the one or more hardware processors to perform operations including: determining that a received request requires a valid copy of a first data object in a first memory; wherein metadata associated with the first data object comprises a plurality of validity flags corresponding to respective memories including the first memory and a second memory, each validity flag indicating whether the respective memory has a copy of the first data object that is valid; determining, based on the validity flag of the first memory, that the first memory does not have the valid copy of the first data object; identifying, based on one or more additional flags among the validity flags, that the second memory has a second copy of the first data object that is valid; determining, at runtime, a command to perform a data transfer of the second copy of the first data object from the second memory to the first memory; and executing the command.

Example 2 includes the subject matter of Example 1, and further specifies that the first memory is a local memory of a first coprocessor, the received request specifies a task scheduled to be executed on the first coprocessor, and the first data object is an input to the task.

Example 3 includes the subject matter of Example 2, and further specifies that the second memory is a local memory of a second coprocessor, the first and second coprocessors being same or distinct classes of computing devices among: graphical processing unit (GPU), digital signal processor (DSP), field programmable gate array (FPGA), transport control protocol (TCP) offload engine, cryptoprocessor, neural network, coarse-grained reconfigurable array (CGRA), very large instruction word (VLIW) processor, multi-processor CPU system, data flow processor, or systolic array.

Example 4 includes the subject matter of any of Examples 1-3, and further specifies that: the first memory is a local memory of a first coprocessor; the received request specifies a task scheduled to be executed on the first coprocessor; the respective memories are a first set of memories among a plurality of memories; execution of the task writes to a second data object in the first memory; metadata associated with the second data object comprises validity flags for a second set of memories, among the plurality of memories, including the first memory; and the operations further comprise: responsive to the received request, setting the validity flags of the second data object to indicate "invalid," for all of the second set of memories other than the first memory.

Example 5 includes the subject matter of Example 4, and further specifies that, for a first validity flag which is the validity flag of the second data object for the first memory, the operations further comprise: setting the first validity flag to indicate "invalid" responsive to the received request and prior to commencement of the task; and setting the first validity flag to indicate "valid" responsive to completion of the task.

Example 6 includes the subject matter of any of Examples 4-5, and further specifies that the second data object is new, and the operations further comprise, prior to the execution of the task: allocating the second data object in the first memory; and instantiating the metadata associated with the second data object.

Example 7 includes the subject matter of any of Examples 1-6, and further specifies that the validity flags for a plurality of the memories indicate "valid," and the identifying the second memory is performed according to a policy that selects the second memory based on efficiency of the data transfer from the second memory to the first memory.

Example 8 includes the subject matter of Example 7, and further specifies that the policy is executed by instructions that: iterate over data transfer types, from most efficient to least efficient, until the second memory is identified; and at each iteration, search for a memory of the memories which (i) is coupled to transfer data to the first memory according to the respective data transfer type, and (ii) has a valid copy of the first data object.

Example 9 includes the subject matter of Example 8, and further specifies that the data transfer types comprise, in decreasing order of efficiency: coprocessor-to-coprocessor transfer among homogeneous coprocessors; transfer by an OpenMP (R) move command; and coprocessor-to-coprocessor transfer among inhomogeneous coprocessors without any OpenMP move command.

Example 10 includes the subject matter of any of Examples 1-9, and further specifies that the instructions are implemented within an Intelligent Runtime System (IRIS) heterogeneous computing framework.

Example 11 includes the subject matter of any of Examples 1-10, and further specifies that a parent data object is hierarchically organized, comprising two or more child data objects, the parent and child data objects each having respective metadata comprising validity flags, and the operations further comprise, for a given memory of the memories: setting the validity flag of the parent data object to indicate "valid" when the validity flags of all the child data objects indicate "valid"; and setting the validity flag of the parent data object to indicate "invalid" when the validity flags of any one or more of the child data objects indicate "invalid".

Example 12 includes the subject matter of Example 11, and further specifies that the operations further comprise: executing a plurality of tasks on respective coprocessors to produce valid copies of the child data objects in respective ones of the memories; executing data transfers to gather valid copies of the child data objects in a common memory of the memories; and executing another task using the parent data object as input.

Example 13 includes the subject matter of any of Examples 11-12, and further specifies that the operations further comprise: executing a task to produce a valid copy of the parent data object in a common memory of the memories; executing data transfers to distribute valid copies of the child data objects among respective ones of the memories; and executing a plurality of tasks on respective coprocessors using the distributed valid copies of the child data objects as inputs.

Example 14 includes the subject matter of any of Examples 1-13, and further specifies that the received request specifies a task scheduled to be executed on a coprocessor hosting the first memory, the task being part of tiled matrix multiplication or tiled LU factorization.

Example 15 is a computer-implemented method, including: determining that a received request requires a valid copy of a first data object in a first memory; wherein metadata associated with the first data object comprises a plurality of validity flags corresponding to respective memories including the first memory and a second memory, each validity flag indicating whether the respective memory has a copy of the first data object that is valid; determining, based on the validity flag of the first memory, that the first memory does not have the valid copy of the first data object; identifying, based on one or more additional flags among the validity flags, the second memory as having a second copy of the first data object that is valid; determining, at run-time, a command to perform a data transfer of the second copy of the first data object from the second memory to the first memory; and executing the command.

Example 16 includes the subject matter of Example 15, and further specifies that the received request specifies a task scheduled to be executed on a coprocessor hosting the first memory, and the first data object is an input to the task.

Example 17 includes the subject matter of any of Examples 15-16, and further specifies that the second memory is a local memory of a second coprocessor, the first and second coprocessors being same or distinct classes of computing devices among: graphical processing unit (GPU), digital signal processor (DSP), field programmable gate array (FPGA), transport control protocol (TCP) offload engine, cryptoprocessor, neural network, coarse-grained reconfigurable array (CGRA), very large instruction word (VLIW) processor, multi-processor CPU system, data flow processor, or systolic array.

Example 18 includes the subject matter of any of Examples 15-17, and further specifies that: the received request specifies a task scheduled to be executed on a coprocessor hosting the first memory; the memories are a first set of memories among a plurality of memories; execution of the task writes to a second data object in the first memory; metadata associated with the second data object comprises validity flags for a second set of memories, among the plurality of memories, including the first memory; and the method further comprises: responsive to the received request, setting the validity flags of the second data object to indicate "invalid," for all of the second set of memories other than the first memory.

Example 19 includes the subject matter of Example 18, and further includes, for a first validity flag which is the validity flag of the second data object for the first memory: setting the first validity flag to indicate "invalid" responsive to the received request and prior to commencement of the task; and setting the first validity flag to indicate "valid" responsive to completion of the task.

Example 20 includes the subject matter of any of Examples 18-19, and further specifies that the second data object is new, and the method further comprises, prior to the execution of the task: allocating the second data object in the first memory; and instantiating the metadata associated with the second data object.

Example 21 includes the subject matter of any of Examples 15-20, and further specifies that the validity flags for a plurality of the memories indicate "valid," and the identifying the second memory is based on a policy that selects the second memory so as to implement a most efficient data transfer to provide the valid copy of the first data object to the first memory.

Example 22 includes the subject matter of Example 21, and further includes executing the policy by: iterating over data transfer types, from most efficient to least efficient, until the second memory is identified; and at each iteration, searching for a memory of the memories (i) coupled to transfer data to the first memory according to the respective data transfer type, and (ii) having a valid copy of the first data object.

Example 23 includes the subject matter of Example 22, and further specifies that the data transfer types comprise, in decreasing order of efficiency: coprocessor-to-coprocessor transfer among homogeneous coprocessors; transfer by an OpenMP (R) move command; and coprocessor-to-coprocessor transfer among inhomogeneous coprocessors without any OpenMP (R) move command.

Example 24 includes the subject matter of any of Examples 15-23, and further specifies that the method is performed within an Intelligent Runtime System (IRIS) heterogeneous computing framework.

Example 25 includes the subject matter of any of Examples 15-24, and further specifies that a parent data object is hierarchically organized, comprising two or more child data objects, the parent and child data objects each having respective metadata comprising validity flags, and the method further comprises: for a given memory of the memories: setting the validity flag of the parent data object to indicate "valid" responsive to determining that the validity flags of all of the child data objects have indicate "valid"; and setting the validity flag of the parent data object to indicate "invalid" responsive to determining that the validity flags of any one or more of the child data objects indicate "invalid".

Example 26 includes the subject matter of Example 25, and further includes: executing a plurality of tasks on respective coprocessors to produce valid copies of the child data objects in respective ones of the memories; form the parent object by executing data transfers to gather valid copies of the child data objects in a common memory of the memories; and executing another task using the parent data object as input.

Example 27 includes the subject matter of any of Examples 25-26, and further includes: executing a task to produce a valid copy of the parent data object in a common memory of the memories; executing data transfers to distribute valid copies of the child data objects among respective ones of the memories; and executing a plurality of tasks on respective coprocessors using the distributed valid copies of the child data objects as inputs.

Example 28 includes the subject matter of any of Examples 15-27, and further specifies that the received request specifies a task scheduled to be executed on a coprocessor hosting the first memory, the task being part of tiled matrix multiplication or tiled LU factorization.

Example 29 is a system, including: a heterogeneous plurality of hardware processors with corresponding memories coupled thereto, the hardware processors comprising at least one host processor and at least two coprocessors; wherein the system is configured to distribute processing tasks of a program among the hardware processors; and computer-readable media storing executable instructions for distributed memory management to be executed by one or more of the hardware processors, the executable instructions comprising: first instructions, execution of which maintains, for each of a plurality of data objects, a respective directory comprising a plurality of entries for respective ones of the memories, each entry comprising a validity flag indicating whether a copy of the corresponding data object, in the respective memory, is valid; second instructions, execution of which identifies, a source memory, among the memories, for a valid copy of a given data object, among the data objects, required by a target coprocessor, among the coprocessors, using the validity flags of the given data object; and third instructions, execution of which (i) copies the valid copy of the given data object from the source memory to a target memory directly addressable by the target coprocessor and (ii) updates the validity flag of the given data object for the target memory.

Example 30 includes the subject matter of Example 29, and further specifies that the coprocessors comprise two or more classes of computing devices among: graphical processing unit (GPU), digital signal processor (DSP), field programmable gate array (FPGA), transport control protocol (TCP) offload engine, cryptoprocessor, neural network, coarse-grained reconfigurable array (CGRA), very large instruction word (VLIW) processor, multi-processor CPU system, data flow processor, or systolic array.

Example 31 includes the subject matter of any of Examples 29-30, and further specifies that the given data object is an input to a task scheduled to be executed on the target coprocessor.

Example 32 includes the subject matter of Example 31, and further specifies that: execution of the task writes to a second data object, of the data objects, in the target memory; and the instructions further comprise: fourth instructions, execution of which, responsive to the received request, sets the validity flags of the second data object to indicate "invalid," for directory entries of the second data object other than the entry for the target memory.

Example 33 includes the subject matter of Example 32, and further specifies that, for a first validity flag which is the validity flag of the second data object for the target memory, and execution of the fourth instructions further: sets the first validity flag to indicate "invalid" responsive to scheduling of the task and prior to commencement of the task; and sets the first validity flag to indicate "valid" responsive to completion of the task.

Example 34 includes the subject matter of any of Examples 32-33, and further specifies that the second data object is new, and the execution of the fourth instruction, prior to execution of the task, further: allocates the second data object in the target memory; and instantiates the metadata associated with the second data object.

Example 35 includes the subject matter of any of Examples 29-34, and further specifies that the validity flags for a plurality of the memories indicate "valid," and the identifying the source memory is based on a policy that selects the source memory so as to implement a most efficient type of data transfer to provide the valid copy of the first data object to the first memory.

Example 36 includes the subject matter of Example 35, and further specifies that execution of the second instructions implements the policy by: iterating over data transfer types supported by the system, from most efficient to least efficient, until the source memory is identified; and at each iteration, searching for a memory of the memories (i) coupled to transfer data to the first memory according to the respective data transfer type, and (ii) having a valid copy of the first data object.

Example 37 includes the subject matter of Example 36, and further specifies that the data transfer types comprise, in decreasing order of efficiency: coprocessor-to-coprocessor transfer among homogeneous coprocessors; transfer by an OpenMP (R) move command; and coprocessor-to-coprocessor transfer among inhomogeneous coprocessors without any OpenMP move command.

Example 38 includes the subject matter of any of Examples 29-37, and further specifies that the system is configured to implement an Intelligent Runtime System (IRIS) heterogeneous computing framework.

Example 39 includes the subject matter of any of Examples 29-38, and further specifies that at least one of the data objects ("parent data object") is hierarchically organized, comprising two or more others ("child data objects") of the data objects, and the executable instructions further comprise fifth instructions, execution of which: sets the validity flag of the parent data object to indicate "valid" when all of the child data objects have validity flags indicating "valid"; and sets the validity flag of the parent data object to indicate "invalid" when any one or more of the child data objects have validity flags indicating "invalid".

Example 40 includes the subject matter of Example 39, and further specifies that the system is further configured to: execute a plurality of tasks on respective coprocessors to produce valid copies of the child data objects in respective memories of the memories; execute data transfers to gather the valid copies of the child data objects in a common memory of the memories; and execute another task using the parent data object as input.

Example 41 includes the subject matter of any of Examples 39-40, and further specifies that the system is further configured to: execute a task to produce a valid copy of the parent data object in a common memory of the memories; execute data transfers to distribute the valid copies of the child data objects among respective ones of the memories; and execute a plurality of tasks on respective coprocessors using the distributed valid copies of the child data objects as inputs.

Example 42 includes the subject matter of any of Examples 29-41, and further specifies that the distributed tasks implement tiled matrix multiplication or tiled LU Factorization Example 43 is a system, including: a heterogeneous plurality of hardware processors with corresponding memories coupled thereto, the hardware processors comprising at least one host processor and at least two coprocessors; wherein the system is configured to distribute processing tasks of a program among the hardware processors; and computer-readable media storing executable instructions for distributed memory management to be executed by one or more of the hardware processors, the executable instructions comprising: first instructions, execution of which dynamically decomposes a client software application into tiled computational tasks linked to a library of computational kernels for respective coprocessors; second instructions, execution of which identifies a source memory having a valid copy of a given data object required by a target coprocessor for execution of one of the tiled tasks, the identifying performed by executing a policy which dynamically selects the source memory based on data transfer performance between the source memory and a local memory of the target coprocessor; and third instructions, execution of which copies the valid copy of the given data object from the source memory to the local memory.

A Generalized Computer Environment

Figure 15:
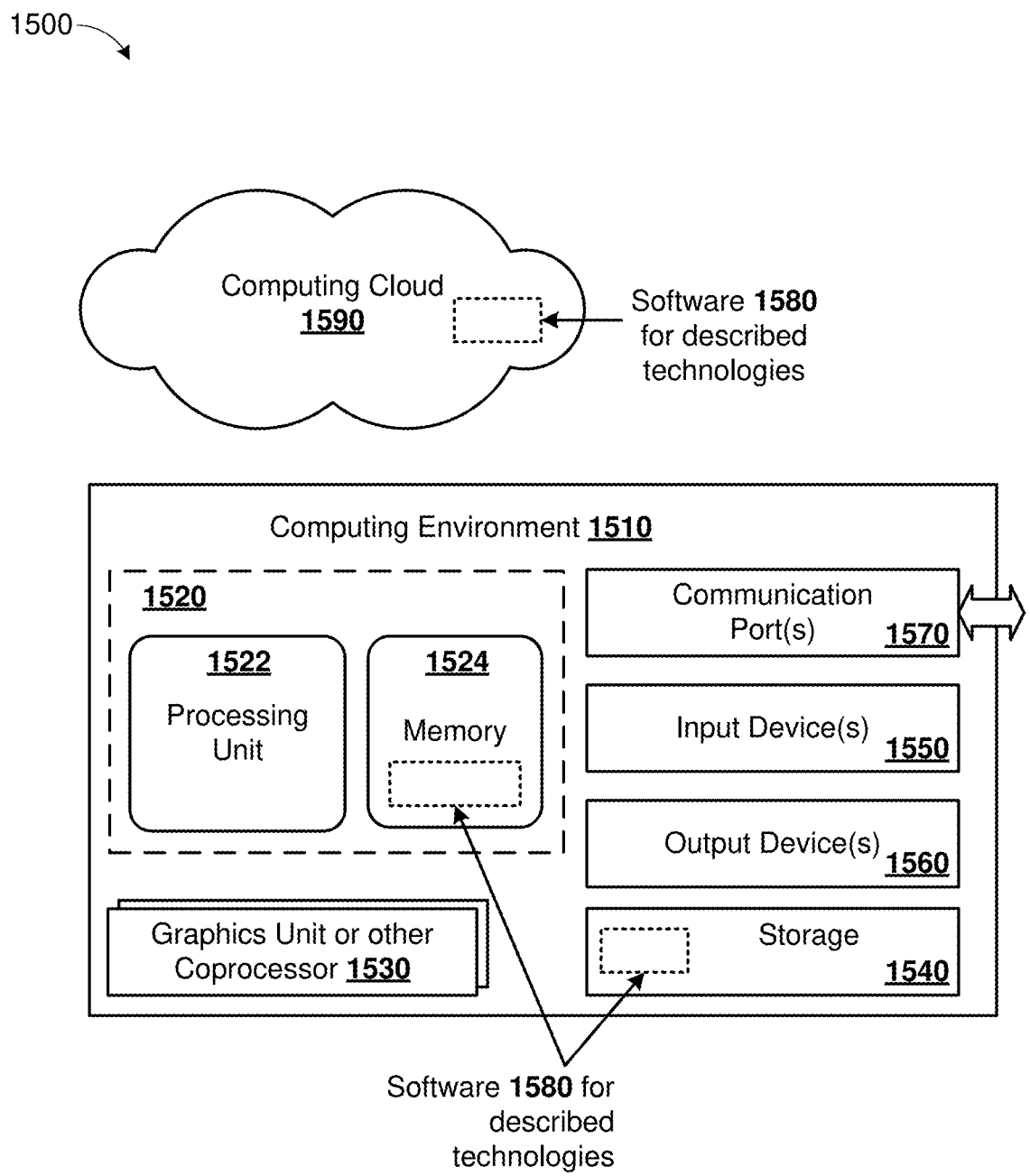
FIG. 15 illustrates a generalized example of a suitable computing environment in which described embodiments, techniques, and technologies pertaining to task scheduling can be implemented.

FIG. 15 illustrates a generalized example of a suitable computing system 1500 in which some described examples, techniques, and technologies for task scheduling or task execution can be implemented. The computing system 1500 is not intended to suggest any limitation as to scope of use or functionality of the present disclosure, as the innovations can be implemented in diverse general-purpose or special-purpose computing systems. The computing system 1500 can perform compilation, decomposition of computation or data objects into tiles, task scheduling, memory management, policy implementation, metadata management, task preprocessing; determination of source memories or data transfer types; gathering or distribution of child data objects; or acquire, process, output, or store associated programs or data.

With reference to FIG. 15, computing environment 1510 includes one or more processing units 1522 and memory 1524. In FIG. 15, this basic configuration 1520 is included within a dashed line. Processing unit 1522 can execute computer-executable instructions, such as for control or data transfer as described herein. Processing unit 1522 can be a general-purpose central processing unit (CPU), a coprocessor such as described herein, or any other type of processor. In a multi-processing system, multiple processing units execute computer-executable instructions to increase processing power. Computing environment 1510 can also include one or more graphics processing units or other coprocessors 1530, in any combination. Tangible memory 1524 can be volatile memory (e.g., registers, cache, queue, or RAM), non-volatile memory (e.g., ROM, EEPROM, or flash memory), or some combination thereof, accessible by processing units 1522, 1530. The memory 1524 stores software 1580 implementing one or more innovations described herein, in the form of computer-executable instructions suitable for execution by the processing unit(s) 1522, 1530. The memory 1524 can also store tasks, input or output data objects, metadata directories, task scheduling information, control parameters, configuration data, or operational data.

A computing system 1510 can have additional features, such as one or more of storage 1540, input devices 1550, output devices 1560, or communication ports 1570. An interconnection mechanism (not shown) such as a bus, controller, or network interconnects the components of the computing environment 1510. Typically, operating system software (not shown) provides an operating environment for other software executing in the computing environment 1510, and coordinates activities of the components of the computing environment 1510.

The tangible storage 1540 can be removable or non-removable, and includes magnetic disks, magnetic tapes or cassettes, CD-ROMs, DVDs, or any other medium which can be used to store information in a non-transitory way and which can be accessed within the computing environment 1510. The storage 1540 stores instructions of the software 1580 (including instructions and/or data) implementing one or more innovations described herein. Storage 1540 can also store store tasks, input or output data objects, metadata directories, task scheduling information, control parameters, pointers, queues, configuration data, or other data items or data structures described herein.

The input device(s) 1550 can be a mechanical, touch-sensing, or proximity-sensing input device such as a keyboard, mouse, pen, touchscreen, or trackball, a voice input device, a scanning device, or another device that provides input to the computing environment 1510. The output device(s) 1560 can be a display, printer, speaker, optical disk writer, or another device that provides output from the computing environment 1510. Input or output can also be communicated to/from a remote device over a network connection, via communication port(s) 1570.

The communication port(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1500 can also include a computing cloud 1590 in which instructions implementing all or a portion of the disclosed technology are executed. Any combination of memory 1524, storage 1540, and computing cloud 1590 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computer," "computing system," "computing environment," and "computing device" are used interchangeably herein. Unless the context clearly indicates otherwise, none of the terms imply any limitation on a type of computing apparatus. In general, a computing apparatus can be local or distributed, and can include any combination of special-purpose hardware (e.g. an accelerator or hard-wired processing circuitry) and/or general-purpose hardware (e.g. a RISC core) and/or virtualized hardware, together with software implementing described functionality.

General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase, and do not imply that the joined terms are mutually exclusive.

The systems, methods, and apparatus described herein should not be construed as limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "accumulate," "allocate," "compute," "determine," "distribute," "evaluate," "execute," "factorize," "find," "generate," "host," "identify," "instantiate," "implement," "indicate," "iterate," "move," "multiply," "optimize," "output," "process," "produce," "provide," "read," "receive," "schedule," "search," "select," "set," "specify," "store," "tile," "transfer," "transmit," "use," and "write" to describe operations performed or controlled by a processor or circuit module in a computer system. These terms can be high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 15, computer-readable storage media include memory 1524 and storage 1540. The terms computer-readable storage media or computer-readable media do not include signals and carrier waves. In addition, the terms computer-readable storage media or computer-readable media do not include communication ports.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C #, CUDA, Curl, Dart, Fortran, Hexagon DSP, HIP, Intel CL, Java, JavaScript, Julia, Lisp, Matlab, Octave, OpenACC, OpenCL, OpenMP, Perl, Python, Qt, R, Ruby, SAS, SPSS, SQL, WebAssembly, Xilinx CL, any derivatives thereof, or any other suitable programming language, or, in some examples, markup languages such as HTML or XML, or with any combination of suitable languages, libraries, and packages. Likewise, the disclosed technology is not limited to any particular computer or type of hardware. Hard-wired implementations can be implemented using electronic design automation (EDA) tools, with the aid of Verilog or VHDL languages. Certain details of suitable computers, hardware, or digital circuitry are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples of the disclosed subject matter and should not be taken as limiting the scope of the claims. Rather, the scope of the claimed subject matter is defined by the following claims. We therefore claim as our invention all that comes within the scope of these claims and their equivalents.

We claim:

1. A computer-implemented method, comprising:
   determining that a received request requires a valid copy of a first data object in a first memory;
   wherein metadata associated with the first data object comprises a plurality of validity flags corresponding to respective memories including the first memory and a second memory, each validity flag indicating whether the respective memory has a copy of the first data object that is valid;
   determining, based on the validity flag of the first memory, that the first memory does not have the valid copy of the first data object;
   identifying, based on one or more additional flags among the validity flags, the second memory as having a second copy of the first data object that is valid, wherein the validity flags for a plurality of the memories indicate "valid," the identifying the second memory is based on a policy that selects the second memory so as to implement a most efficient data transfer to provide the valid copy of the first data object to the first memory, wherein executing the policy comprises
   iterating over data transfer types, from most efficient to least efficient, until the second memory is identified, and
   at each iteration, searching for a memory of the memories (i) coupled to transfer data to the first memory according to the respective data transfer type, and (ii) having a valid copy of the first data object;
   determining, at run-time, a command to perform a data transfer of the second copy of the first data object from the second memory to the first memory; and
   executing the command.

2. The computer-implemented method of claim 1, wherein the received request specifies a task scheduled to be executed on a coprocessor hosting the first memory, and the first data object is an input to the task.

3. The computer-implemented method of claim 1, wherein:
   the received request specifies a task scheduled to be executed on a coprocessor hosting the first memory;
   the memories are a first set of memories among a plurality of memories;
   execution of the task writes to a second data object in the first memory;

metadata associated with the second data object comprises validity flags for a second set of memories, among the plurality of memories, including the first memory; and the method further comprises:

responsive to the received request, setting the validity flags of the second data object to indicate "invalid," for all of the second set of memories other than the first memory.

4. The computer-implemented method of claim 3, wherein the second data object is new, and the method further comprises, prior to the execution of the task:

allocating the second data object in the first memory; and
instantiating the metadata associated with the second data object.

5. The computer-implemented method of claim 1, wherein a parent data object is hierarchically organized, comprising two or more child data objects, the parent and child data objects each having respective metadata comprising validity flags, and the method further comprises:

executing a plurality of tasks on respective coprocessors to produce valid copies of the child data objects in respective ones of the memories;

form the parent data object by executing data transfers to gather valid copies of the child data objects in a common memory of the memories; and executing another task using the parent data object as input.

6. The computer-implemented method of claim 1, wherein a parent data object is hierarchically organized, comprising two or more child data objects, the parent and child data objects each having respective metadata comprising validity flags, and the method further comprises:

executing a task to produce a valid copy of the parent data object in a common memory of the memories;

executing data transfers to distribute valid copies of the child data objects among respective ones of the memories; and executing a plurality of tasks on respective coprocessors using the distributed valid copies of the child data objects as inputs.

7. The computer-implemented method of claim 1, wherein the received request specifies a task scheduled to be executed on a coprocessor hosting the first memory, the task being part of tiled matrix multiplication or tiled LU factorization.

8. One or more computer-readable media storing instructions which, when executed by one or more hardware processors, cause the one or more hardware processors to perform operations comprising:

determining that a received request requires a valid copy of a first data object in a first memory;

wherein metadata associated with the first data object comprises a plurality of validity flags corresponding to respective memories including the first memory and a second memory, each validity flag indicating whether the respective memory has a copy of the first data object that is valid;

determining, based on the validity flag of the first memory, that the first memory does not have the valid copy of the first data object;

identifying, based on one or more additional flags among the validity flags, that the second memory has a second copy of the first data object that is valid;

determining, at runtime, a command to perform a data transfer of the second copy of the first data object from the second memory to the first memory; and executing the command, wherein a parent data object is hierarchically organized and comprises two or more child data objects, the parent and child data objects each having respective metadata comprising validity flags, and wherein the operations further comprise, for a given memory of the memories, setting the validity flag of the parent data object to indicate "valid" when the validity flags of all the child data objects indicate "valid", and setting the validity flag of the parent data object to indicate "invalid" when the validity flags of any one or more of the child data objects indicate "invalid".

9. The one or more computer-readable media of claim 8, wherein the first memory is a local memory of a first coprocessor, the received request specifies a task scheduled to be executed on the first coprocessor, and the first data object is an input to the task.

10. The one or more computer-readable media of claim 8, wherein:

the first memory is a local memory of a first coprocessor;
the received request specifies a task scheduled to be executed on the first coprocessor;
the respective memories are a first set of memories among a plurality of memories;
execution of the task writes to a second data object in the first memory;
metadata associated with the second data object comprises validity flags for a second set of memories, among the plurality of memories, including the first memory; and
the operations further comprise:
responsive to the received request, setting the validity flags of the second data object to indicate "invalid," for all of the second set of memories other than the first memory.

11. The one or more computer-readable media of claim 10 wherein, for a first validity flag which is the validity flag of the second data object for the first memory, the operations further comprise:

setting the first validity flag to indicate "invalid" responsive to the received request and prior to commencement of the task; and setting the first validity flag to indicate "valid" responsive to completion of the task.

12. The one or more computer-readable media of claim 8, wherein the validity flags for a plurality of the memories indicate "valid," and the identifying the second memory is performed according to a policy that selects the second memory based on efficiency of the data transfer from the second memory to the first memory.

* * * * *